United States Patent
Sumida et al.

[19]

[11] Patent Number: 5,877,864

[45] Date of Patent: Mar. 2, 1999

[54] IMAGE FORMING APPARATUS WHICH DETERMINES IF MEMORY WILL OVERFLOW BEFORE READING AN IMAGE TO STORE IN THE MEMORY

[75] Inventors: Hiroyasu Sumida; Toshiya Tagawa, both of Ichikawa, Japan

[73] Assignee: Ricoh Company, Ltd., Tokyo, Japan

[21] Appl. No.: 716,526

[22] Filed: Sep. 19, 1996

[30] Foreign Application Priority Data

Sep. 19, 1995 [JP] Japan ..................................... 7-240139

[51] Int. Cl.[6] ............................. B41B 15/00; H04N 1/00
[52] U.S. Cl. ............................ 395/115; 358/401; 358/404
[58] Field of Search ................................... 358/400, 401, 358/404, 444, 296, 449; 395/115

[56] References Cited

U.S. PATENT DOCUMENTS

| | | | |
|---|---|---|---|
| 5,223,948 | 6/1993 | Sakurai et al. ........................... | 358/404 |
| 5,253,077 | 10/1993 | Hasegawa et al. ....................... | 358/404 |
| 5,570,201 | 10/1996 | Yokota ..................................... | 358/404 |

*Primary Examiner*—Kim Yen Vu
*Assistant Examiner*—Kimberly A. Williams
*Attorney, Agent, or Firm*—Oblon, Spivak, McClelland, Maier & Neustadt, P.C.

[57] ABSTRACT

An image forming apparatus which stores image data of an image of each page of an original document into a memory and then outputs the image data stored in the memory in order of pages of the original document to record the corresponding image on a recording medium for producing a requested number of sets of copies of the original document. A controller determines, each time after image data for one page of the original document is stored in the memory, whether or not the memory will overflow if image data of a next page of the original document is stored in the memory. The controller prohibits reading of an image of the next page of the original document when it determines that the memory will overflow.

12 Claims, 20 Drawing Sheets

IMAGE FORMING APPARATUS WHICH DETERMINES IF MEMORY WILL OVERFLOW BEFORE READING AN IMAGE TO STORE IN THE MEMORY

BACKGROUND OF THE INVENTION

1. Field of the Invention

The present invention relates to an image forming apparatus which stores image data of each page of a multiple page original document once into an image memory and which then outputs each of the image data stored in the image memory in order of pages of the original document to record the corresponding image on a recording medium for producing a requested number of sets of copies of the original document.

2. Discussion of the Background

A function of an image forming apparatus to store image data of each page of a multiple page original document once into a memory, and to then output the image data stored in the memory in order of pages of the original document, to record the corresponding image on a recording medium for producing a requested number of sets of copies of the original document is called electronic sorting.

Generally, for storing image data of a multiple page original document into an image memory, an image forming apparatus having an electronic sorting function reads an image of each page of the original document with an image reading device page after page and writes resulting image data into the image memory. When a writing address of the image memory exceeds a last address of the memory while storing the image data into the memory, the image forming apparatus prohibits writing the image data into the memory thereafter, and discontinues reading of the original document at the same time. Once reading of the original document is discontinued, an operator instructs the image forming apparatus to output the image data stored in the memory to record the corresponding images on recording media to produce a requested number of sets of copies of pages of the original document which have been read and stored in the memory. After the requested number of sets of copies of such pages are made, the operator instructs the image forming apparatus to restart reading of an image of each page of the original document which remains to be copied.

The image forming apparatus with the above-mentioned electronic sorting function determines if the memory will overflow, after reading an image of a page of the original document and after starting writing of the resulting image data into the memory, when the writing address exceeds the last address of the memory. Therefore, it may occur that the memory will overflow in the middle of writing image data of a certain page of the original document into the memory. In such a case, the image of that page of the original document needs to be read again since the image data of that page is not stored in the memory.

Therefore, if an operator has removed from the contact glass the page of the original document for which image data has not been stored in the memory due to a memory overflow, the operator needs to put that particular page back on the contact glass for reading the image of the page again. When an automatic document feeder is used, the sheet of the original document, which is fed out from the automatic document feeder onto the contact glass so as to be read by the reading device, has to be taken out of the contact glass and put back on the automatic document feeder again, thus causing lowering of copying productivity.

Further, there is a possibility that the operator misunderstands that the image of the page of the original document which is on the contact glass has been read and the resulting image data has been stored in the memory, even though the image data for that particular page has not been stored in the memory due to the memory overflow which occurred during storing of the image data of that page in the memory. If the operator then restarts copying of the original document from a next page of the original document, it results that the page of the image data which has not been stored in the memory due to the memory overflow during storing of the image data thereof is missed from the copies.

For preventing occurrence of missing pages as mentioned above, it is necessary to display a message, as an example, indicating that the page on the contact glass has not been read and is required to be read again, making the process of displaying messages relatively complicated.

SUMMARY OF THE INVENTION

The present invention has been made in view of such problems and to address and resolve these problems.

Accordingly, an object of the present invention is to provide a novel image forming apparatus which improves copying efficiency and simplifies a copying process by eliminating occurrence of an overflow of an image memory during storing of image data of a certain page of an original document.

The novel image forming apparatus of the present invention determines, before reading an image of a next page of the original document for storing resulting image data into an image memory, whether or not the image memory will overflow if the image of the next page of the original document is read and if resulting image data is stored in the image memory and, when it is determined that the image memory will overflow, prohibits reading of the next page of the original document.

In order to achieve the above-mentioned objects, an image forming apparatus according to the present invention includes a device for placing thereupon a sheet of an original document, a device for reading an image of each page of the original document placed on the original document placement device, an image memory for storing therein image data of the image of each page of the original document which is read by the original document reading device, a device for outputting the image data of each page of the original document stored in the image memory, in order of pages of the original document, and a device for recording the corresponding image on a recording medium. A controller of the image forming apparatus determines if a predetermined maximum amount of image data for one page of the original document exceeds a remaining storage capacity of the image memory each time after the original document reading device reads an image of one page of the original document and stores a resulting image data into the image memory. Then the controller prohibits reading of a next page of the original document with the original document reading device if the predetermined maximum amount of image data for one page of the original document exceeds the remaining storage capacity of the image memory.

The image forming apparatus according to the present invention further includes a device for feeding a sheet of the multiple sheet original document onto the original document placement device sheet after sheet. The above-mentioned controller determines if the predetermined maximum amount of image data for one page of the original document exceeds the remaining storage capacity of the image memory each time after the original document feeding device feeds each page of the original document onto the original document placement device so that the original document reading device reads an image of each page of the original document which is fed onto the original document placement device and the resulting image data is stored into the image memory. Then the controller prohibits feeding of a next page of the original document with the original document feeding device if the predetermined maximum amount of image data for one page of the original document exceeds the remaining storage capacity of the image memory.

Further, the image forming apparatus according to the present invention includes a device for detecting a size of each page of the original document before an image of each page of the original document is read by the image reading device. The above-mentioned controller determines, based upon the size of each page of the original document which is detected by the original document size detect device, if an amount of image data of each page of the original document, the size of which is detected by the original document size detect device, exceeds a remaining storage capacity of the image memory.

Furthermore, the image forming apparatus according to the present invention includes a device for prescribing a mixed-size original document reading mode. The above-mentioned controller determines if an amount of image data of each page of the original document, the size of which is detected with the original document size detect device, exceeds the remaining storage capacity of the image memory, based upon the size of the page of the original document which is detected with the original document size detect device, when the mixed-size original document reading mode is prescribed. The controller determines if an amount of image data of a next page of the original document exceeds the remaining storage capacity of the image memory based upon the size of a first page of the original document which is detected with the original document size detect device when the mixed-size original document reading mode is not prescribed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
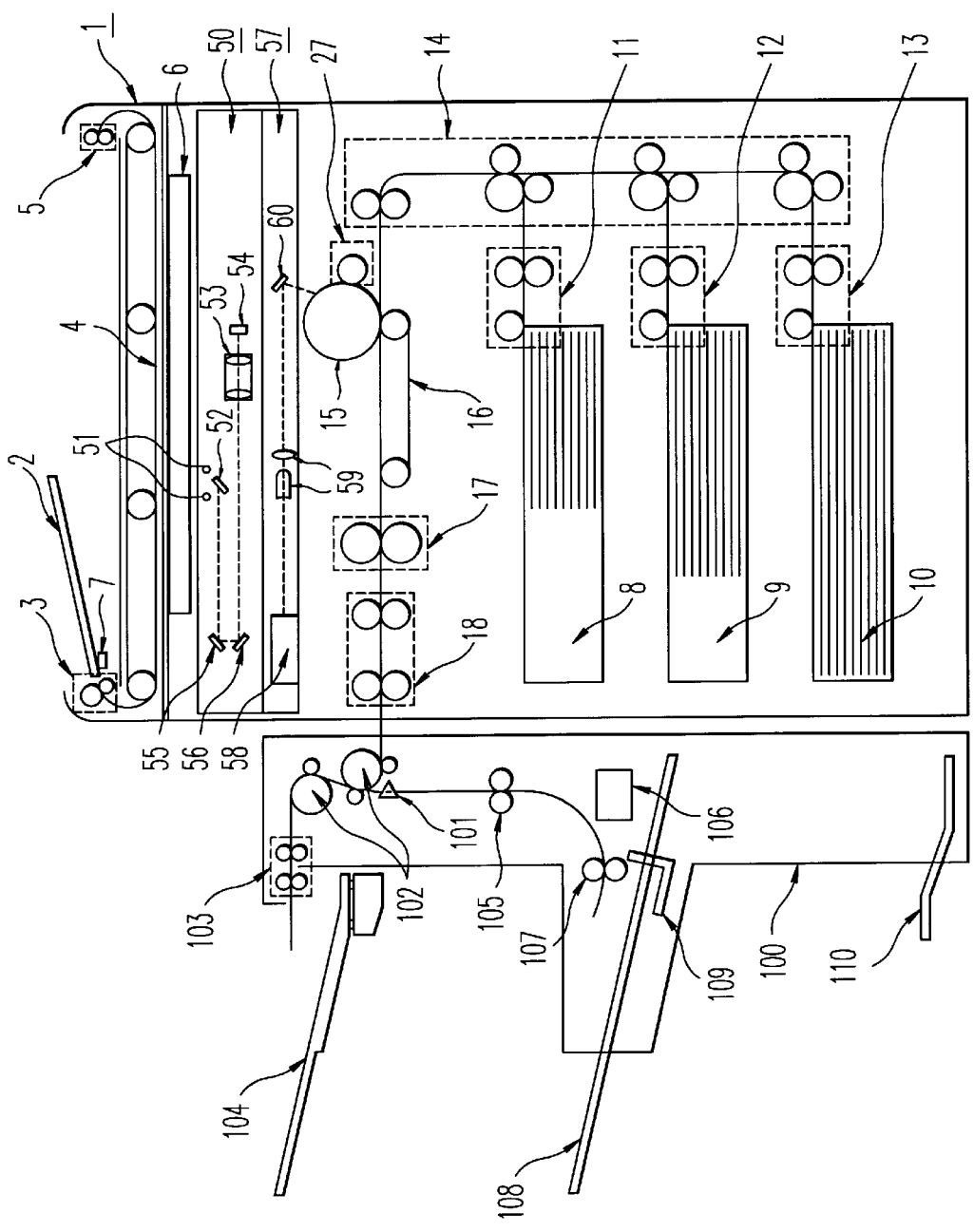
FIG. 1 is a schematic drawing illustrating an example of a structure of a digital copying machine.

Referring now to the drawings, wherein like reference numerals designate identical or corresponding parts throughout the several views, embodiments of the present invention are explained hereinbelow.

FIG. 1 is a schematic drawing illustrating an example of a structure of a digital copying machine.

The copying machine illustrated in FIG. 1 is constructed essentially from an automatic document feeder (ADF) 1, an image reading unit 50, an image forming unit including an image writing unit 57, and a finisher 100. The ADF 1 feeds out one sheet of an original document which is placed on an original document plate 2 with an image carrying surface facing upward, starting with a bottom sheet of the original document by means of a feeding roller 3 and a feeding belt 4 to a predetermined position on a contact glass 6 provided on the image reading unit 50. Then the image reading unit 50 reads an image of the image carrying surface of the sheet of the original document which is fed to the predetermined position on the contact glass 6.

The sheet of the original document is then output from the contact glass 6 by means of the feeding belt 4 and an output roller 5. If existence of a next sheet of the original document on the original document plate 2 is detected by an original document detector 7, the next sheet of the original document is fed like the previous sheet. The feeding roller 3, the feeding belt 4 and the output roller 5 are driven by a drive motor 26 shown later in FIG. 4. The ADF 1 is arranged so as to open and close at the front side end or at the left side end relative to the contact glass 6, and an operator may place an original document on the contact glass 6 when the ADF 1 is opened.

The image reading unit 50 includes an exposure lamp 51, a first mirror 52, a second mirror 55, a third mirror 56, an imaging lens 53, and an image reader 54 constituted of a charge-coupled-device (CCD). The exposure lamp 51 and the first mirror 52 are fixed on a first carriage (not shown), and the second mirror 55 and the third mirror 56 are fixed on a second carriage (not shown).

The first carriage and the second carriage are driven by a drive motor (not shown) to move in a secondary scanning direction at a relative speed of 2 to 1 so as to keep a constant optical path length when reading an original document. An image reading magnification may be changed by moving the imaging lens 53 and the CCD image reader 54 along the optical path to corresponding positions respectively. An image of an original document is read and converted to an electrical signal with the CCD image reader 54. Then the resulting electrical signal is processed by an image processing unit 49 which is later shown in FIGS. 4 and 5.

The image writing unit 57 includes a laser output unit 58, an imaging lens 59 and a mirror 60. The laser output unit 58 includes a laser diode as a laser optical source and a polygon mirror which is rotated by a motor at a constant high speed. The writing unit 57 ejects a laser light which is modulated in accordance with an image signal, and the laser light forms a latent image on a surface of a photoconductor 15 of the image forming unit. A beam sensor (not shown) is provided at a vicinity of one end of the photoconductor 15 for obtaining a signal for synchronizing the laser light in a primary scanning direction.

The image forming unit includes the photoconductor 15 and a mechanism for electrophotography (not shown). A developing unit 27 develops an electrostatic latent image on the photoconductor 15 with toner, and the toner image is then transferred onto a transfer sheet. Transfer sheets placed in a first tray 8, a second tray 9 and a third tray 10 are respectively fed out from the trays by a first feeding unit 11, a second feeding unit 12 and a third feeding unit 13 and are then fed upward by a vertical transporting unit 14 to a transfer position facing the photoconductor 15. The transfer sheet is transported by a transport belt 16 at a speed equal to a rotating speed of the photoconductor 15 and then the toner image is transferred thereupon from the photoconductor 15. The toner image on the transfer sheet is then fixed by a fixing unit 17 and the transfer sheet is transported to the finisher 100 by an output unit 18.

The finisher 100 selectively guides the transfer sheet in a direction toward output rollers 102 or in a direction toward a stapling unit provided at a downward position. The transfer sheet guided to the output rollers 102 is output on an output tray 104 via a feed roller 103. The output tray 104 moves between two positions widthwise relative to the transport direction of the transfer sheet so as to shift a position of the transfer sheet which is output on the output tray 104 one after the other in accordance with a change of a sheet of the original document or completion of a set of copies of the multiple page original document with the electronic sorting function, thus placing completed copies as sorted on the output tray 104.

The transfer sheet guided to the stapling unit is transported onto a stapling plate 108 via pairs of feed rollers 105 and 107. The transfer sheet transported onto the stapling plate 108 is jogged by a jogger 109 to align correctly each sheet widthwise with each other each time one transfer sheet is output onto the stapling plate 108, and a set of the transfer sheets are then stapled by a stapler 106. The stapled sets of the transfer sheets are then dropped on a tray 110 by its own weight.

Figure 2:
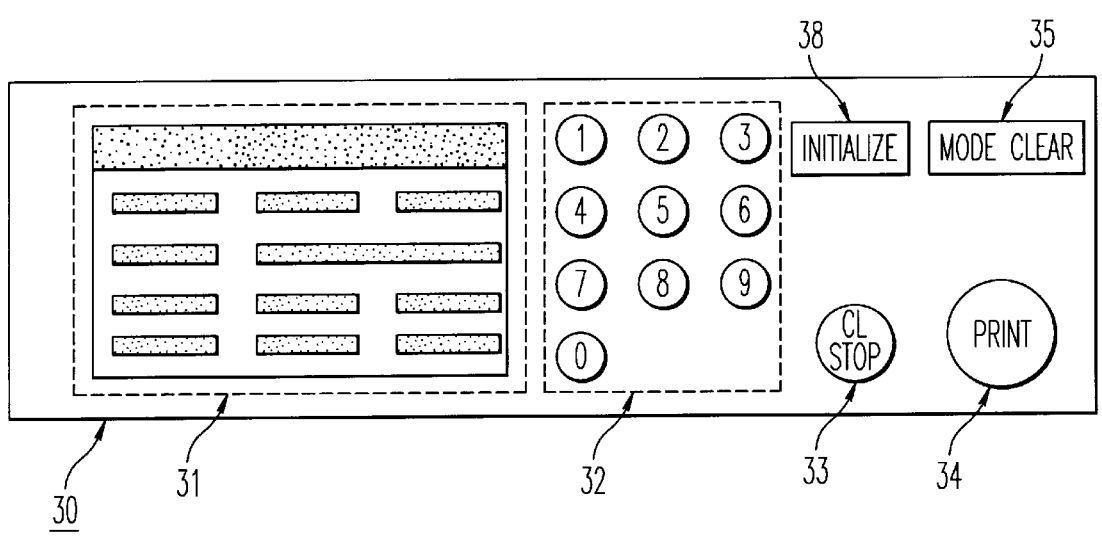
FIG. 2 is a schematic drawing illustrating an example of an operational panel of the digital copying machine.

FIG. 2 is a schematic drawing illustrating an example of an operational panel of the digital copying machine, and the operational panel 30 includes, as illustrated in FIG. 2, a touch sensitive LCD (liquid crystal display) panel 31, a ten-key panel 32, a clear/stop key 33, a print key 34, a mode clear key 35 and an initialize key 38.

Figure 3:
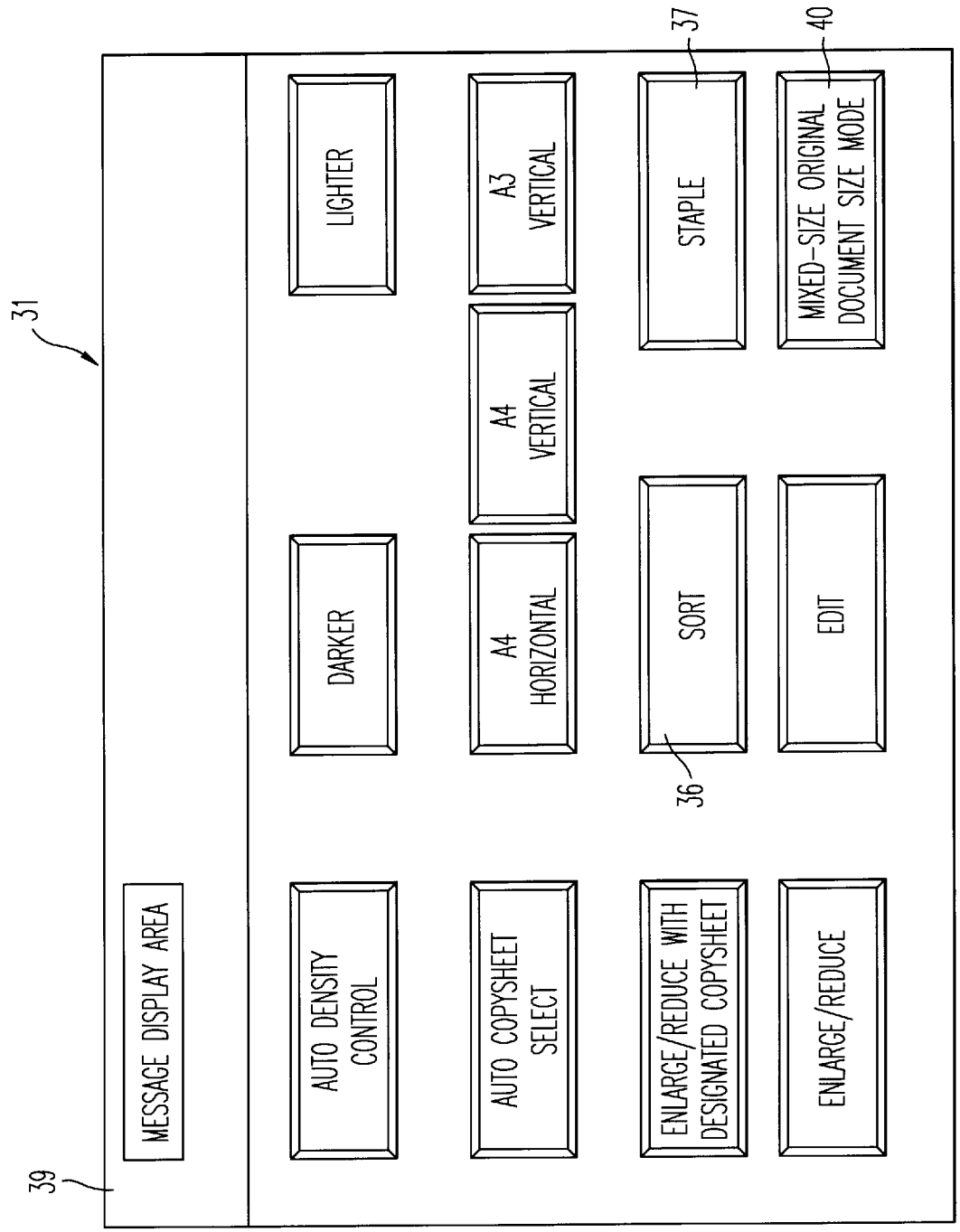
FIG. 3 is a schematic drawing illustrating an example of a touch sensitive LCD display panel of the operational panel shown in FIG. 2.

FIG. 3 is a schematic drawing illustrating an example of the touch sensitive LCD panel 31 of the operational panel 30 shown in FIG. 2. The touch sensitive LCD panel 31 displays various touch sensitive function keys, as shown in FIG. 3, including a sort function key 36 for sorting copies, a staple function key 37 for stapling copies and a mixed-size original size mode key 40 for prescribing a mixed-size original document mode, with which a size of each sheet of the original document is detected with an original document size detector 41, which is shown later in FIG. 4. The touch sensitive LCD panel 31 further includes a message display area 39 to indicate various messages, such as for example, a number of copies, conditions of the machine and the like. When the ADF 1 is opened to place an original document on the contact glass 6 for copying, the message display area 39 displays an original document end key as a touch sensitive key and a message requesting to depress the original document end key when images of all pages of the original document are read.

Figure 4:
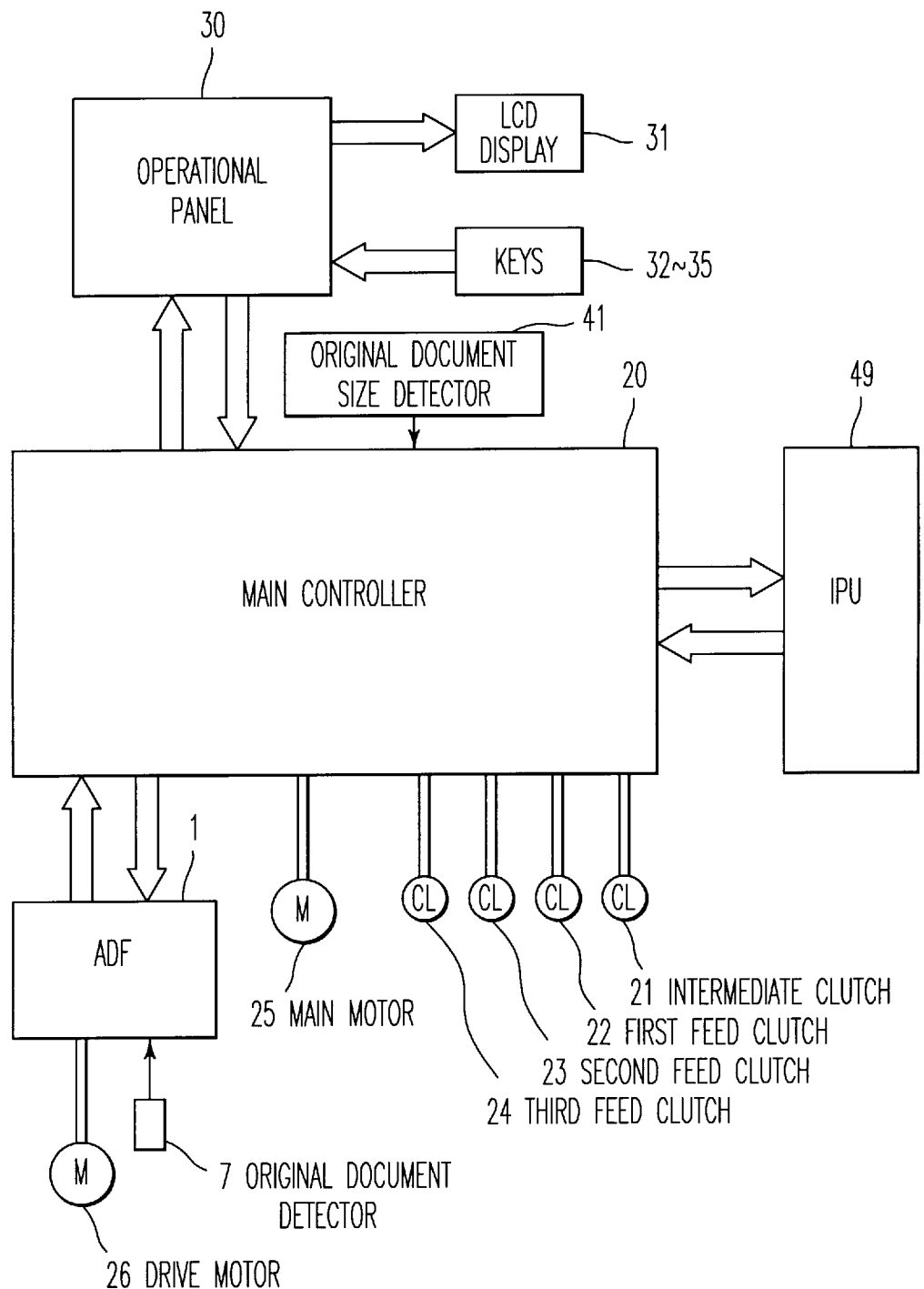
FIG. 4 is a functional block diagram illustrating an example of a structure of the digital copying machine shown in FIG. 1.

FIG. 4 is a functional block diagram illustrating an example of a structure of the digital copying machine shown in FIG. 1. A main controller 20 controls driving of a main motor 25 which drives the photoconductor 15, the transport belt 16, the fixing unit 17, the output unit 18 and the developing unit 27, which are shown in FIG. 1. Further, a driving force of the main motor 25 is conveyed under the control of the main controller 20 to the first, second and third feeding units 11, 12 and 13, which are shown in FIG. 1, via first, second and third feeding clutches 22, 23 and 24 respectively, and further, to the vertical transport unit 14 via an intermediate clutch 21. The main controller 20 further receives a detect signal from the original document size detector 41, which is provided under the contact glass 6 in FIG. 1, to determine a size of the original document placed on the contact glass 6. The main controller 20 controls likewise an image processing unit (IPU) 49, which is described next in detail.

Figure 5:
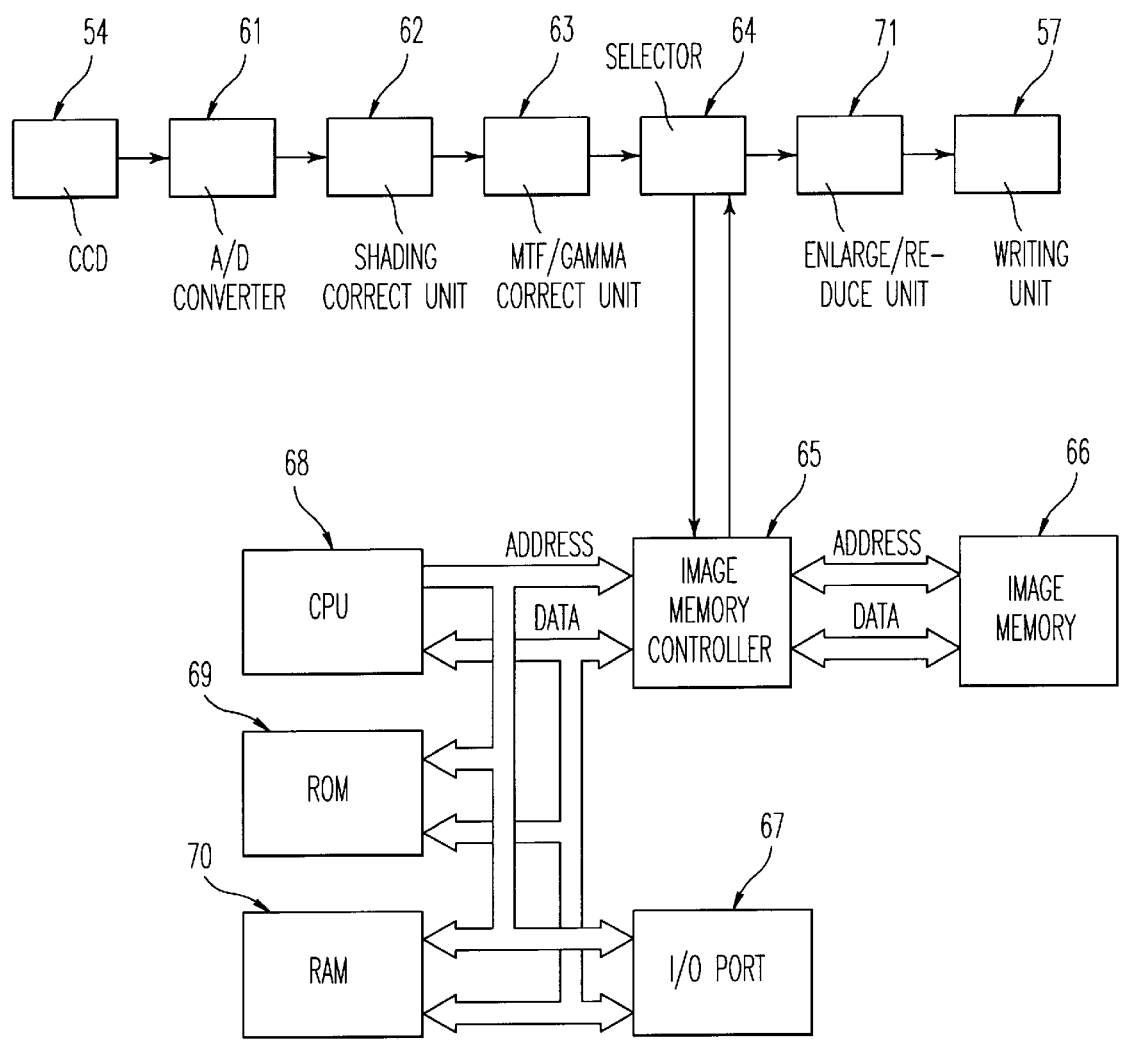
FIG. 5 is a functional block diagram illustrating an example of an image processing unit of the digital copying machine shown in FIGS. 1 and 4.

FIG. 5 is a functional block diagram illustrating an example of the image processing unit (IPU) 49. As shown in FIG. 5, the CCD image reader 54 converts an optical image of an original document into an electrical signal, which is then converted to a digital image signal by an A/D converter 61. The digital image signal is then processed for shading correction by a shading correct unit 62 and is further processed for MTF and gamma correction by a MTF/gamma correct unit 63. The digital image signal thus processed is then applied to a selector 64.

The selector 64 selectively outputs the image signal either to an enlarge/reduce unit 71 or to an image memory controller 65. Further, the selector 64 outputs an image signal from the image memory controller 65 to the enlarge/reduce unit 71. Namely, the image memory controller 65 and the selector 64 are configured to input and output in both directions. The enlarge/reduce unit 71 enlarges and reduces the image signal in accordance with a prescribed magnification and outputs the resulting signal to the writing unit 57.

The image processing unit (IPU) 49 includes a CPU 68 which prescribes various conditions to the image memory controller 65, the image reading unit 50 and the writing unit 57, and a ROM 69 to store programs for the CPU 68, a RAM 70 including a working area for the CPU 68 and an I/O port 67.

The CPU 68 writes and reads image data of the original document to and from an image memory 66 in order of pages of the original document via the image memory controller 65. Further, the CPU 68 determines, before reading an image of a next page of the original document, whether or not the image memory 66 will overflow if the next page of the original document is read and if the resulting image data is stored in the image memory 66. If it is determined that a memory overflow will occur, the CPU 68 prohibits reading of the next page of the original document. In a case that the ADF 1 is used, the CPU 68 prohibits feeding of a next sheet of the original document with the ADF 1.

Figure 6:
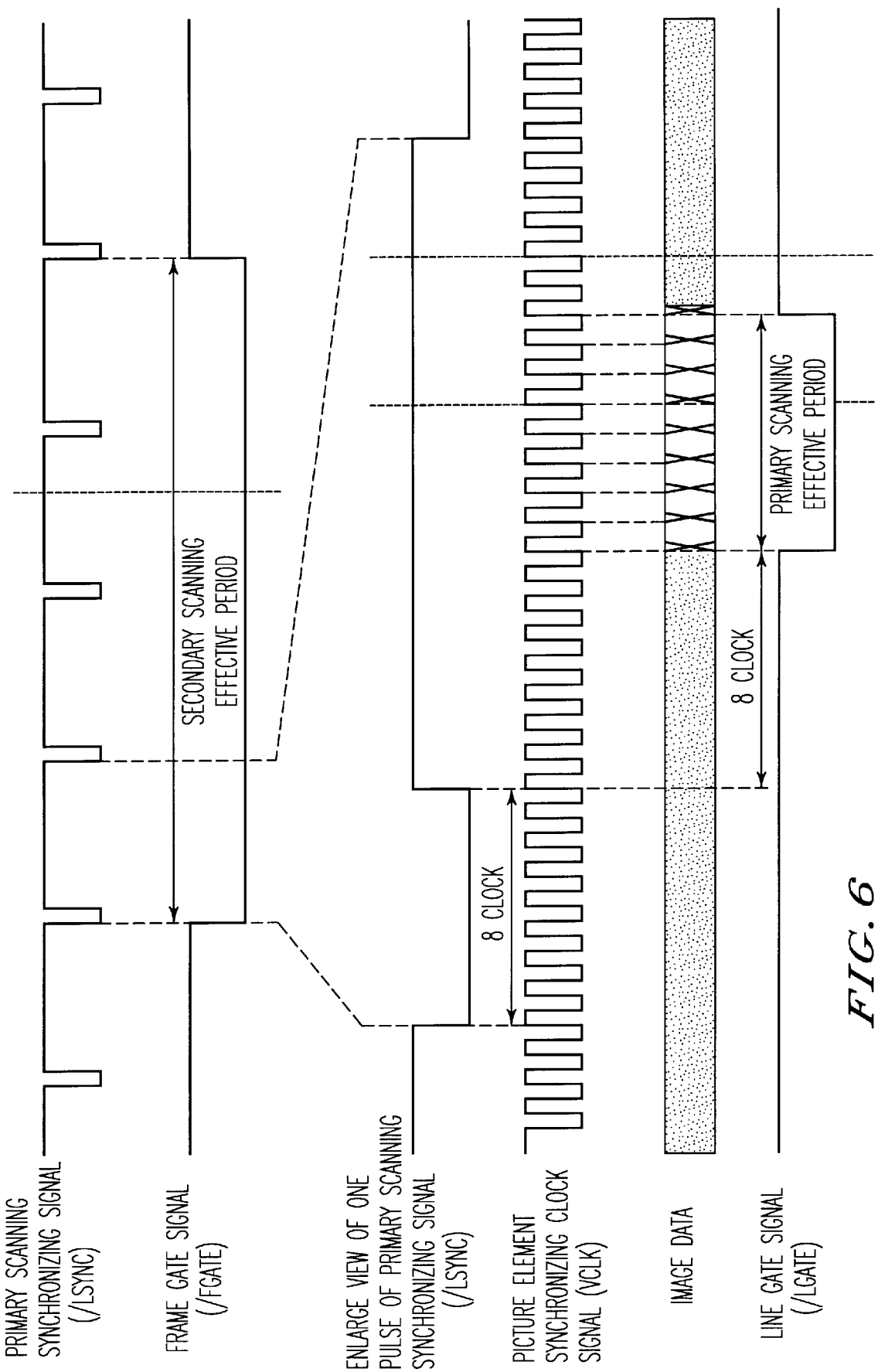
FIG. 6 is a timing chart illustrating a timing sequence of reading an image.

Next, a timing sequence of reading image data for one page of the original document is explained referring to FIG. 6. In FIG. 6, a frame gate signal (/FGATE) represents an effective period of image data for a secondary scanning direction with a low level signal and a primary scanning synchronizing signal (/LSYNC) represents a synchronizing signal for each scanning line. The image signal becomes effective after a predetermined number of clocks after the primary scanning synchronizing signal is raised. The frame gate signal (/FGATE) and the primary scanning synchronizing signal (/LSYNC) synchronize with a picture element clock (VCLK) respectively, and an image signal for one picture element in 8 bits (representing 256 steps of gray scale) is sent per one clock cycle of the picture element clock (VCLK).

Figure 7:
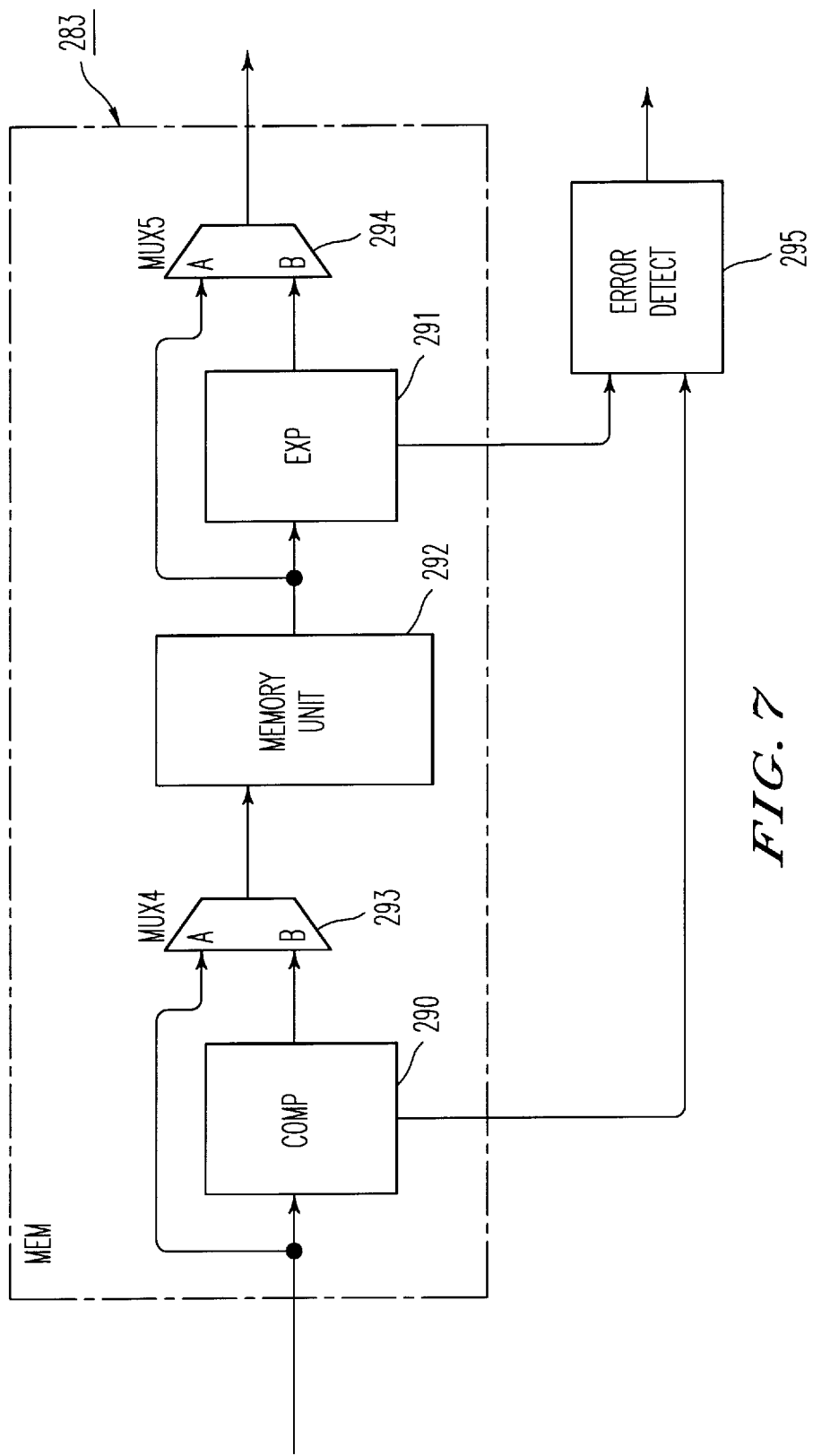
FIG. 7 is a block diagram illustrating an example of an image memory system of the image processing unit shown in FIG. 5.

FIG. 7 is a block diagram illustrating an example of an image memory system 283 which is realized by the image memory controller 65 and the image memory 66. A compressor (COMP) 290 and a decompressor (EXP) 291 are connected to a memory unit 292, and compressed data or raw data (data not compressed) is stored into the memory unit 292 by selecting an input with a multiplexer 293. The compressor (COM) 290, the multiplexers 293 and 294 and the decompressor (EXP) 291 are provided in the memory controller 65 and the memory unit 292 is provided in the image memory 66. In this case, the compressor (COM) 290 is required to operate in synchronization with an operational speed of the image reading unit and the decompressor (EXP) 291 is required to operate in synchronization with an operational speed of the image forming unit. An error during compression and decompression is detected by an error detector 295.

Figure 8:
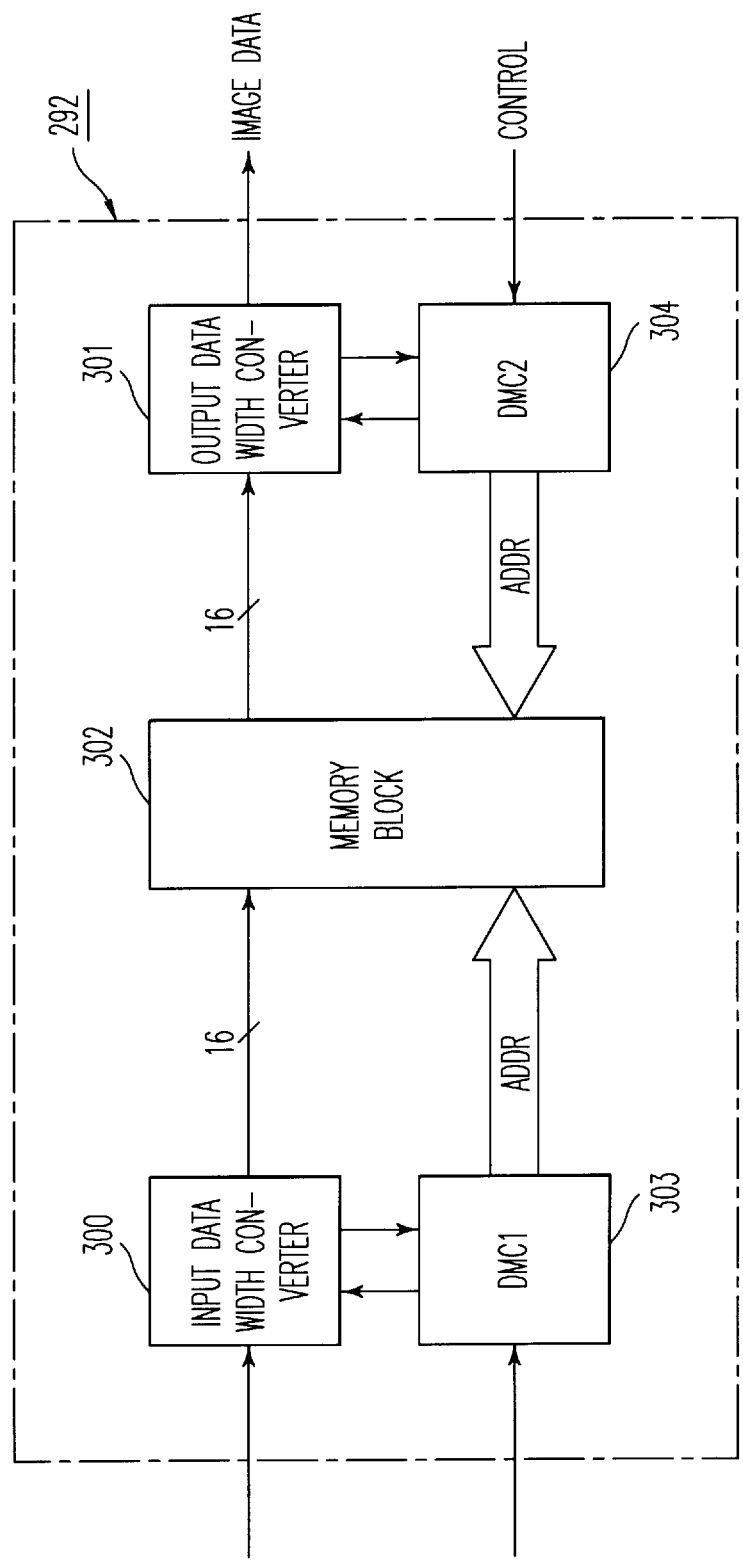
FIG. 8 is a block diagram illustrating an example of a memory unit of the image memory system shown in FIG. 7.

FIG. 8 is a block diagram illustrating an example of the memory unit 292 shown in FIG. 7. The memory unit 292 includes an input data width converter 300 and an output data width converter 301 at an input side and an output side of a memory block 302 respectively. The memory block 302 has a 16 bit data width, and the input data width converter 300 converts one bit, 4 bit and 8 bit data and compressed data to 16 bit data and the output data width converter 301 converts 16 bit data to one bit, 4 bit or 8 bit data respectively. Direct memory access controllers (DMC1 and DMC2) 303 and 304 control writing data in an address of the memory block 302 and reading data therefrom in accordance with a number of data (picture elements) which are packed in a 16 bit width and a data width of the memory block 302, a 16 bit width in this case. Further, the memory unit 292 manages addresses of the memory block 302 and the remaining storage capacity of the memory block 302 as well.

Figure 9A:
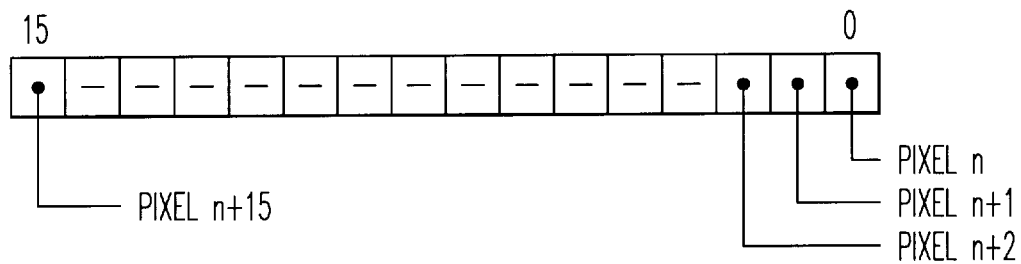
FIGS. 9(a)–9(c) are illustrations showing respectively data in one bit, four bits and eight bits which are packed in 16 bit width.
Figure 9B:
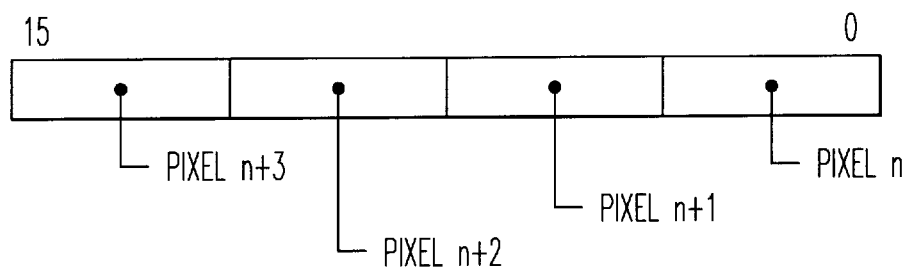
Figure 9C:
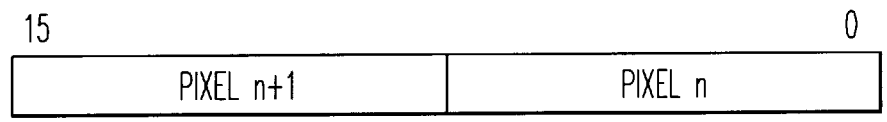

The transfer speed of image data from the image reading unit to the image processing unit (IPU) 49 and the transfer speed of the image data to the image forming unit therefrom are generally constant irrespective of the data width, such as 8 bit, 4 bit and one bit, and one cycle for transferring data for one picture element is fixed. Image data from the image reading unit is arranged in a one bit, 4 bit or 8 bit width with the most significant bit of 8 data lines at the most significant bit of each data width, and then the input data width converter 300 packs a plurality of data in one bit, 4 bit or 8 bit data, each representing one picture element, into a 16 bit width as shown in FIGS. 9(*a*), 9(*b*) and 9(*c*) for inputting the data to the memory block 302. In FIGS. 9(*a*)–9(*c*), numeral 0 denotes a least significant bit and numeral 15 denotes a most significant bit of 16 bit width data as stored in the memory block 302. The output data converter 301 unpacks 16 bit data thus packed to 8 bit, 4 bit or one bit data for inputting to the image forming unit. Since a plurality of data in one bit, 4 bit or 8 bit are packed in a 16 bit width when storing in the memory block 302, it does not occur that only one bit, 4 bit or 8 bit data is stored in a 16 bit memory space, and thus the memory block 302 is used very effectively.

Figure 10:
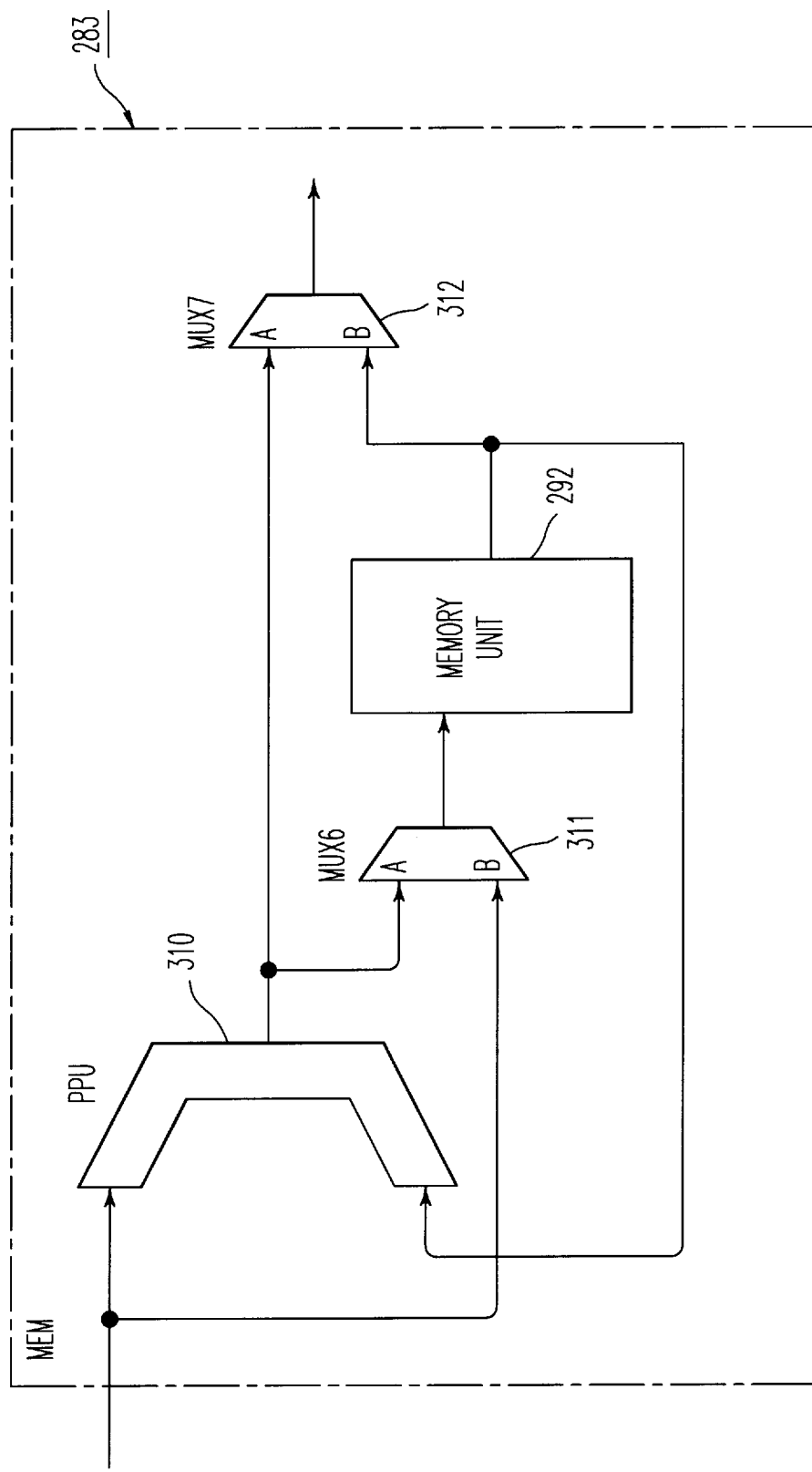
FIG. 10 is a block diagram illustrating another example of the image memory system.

FIG. 10 is a block diagram illustrating another example of a structure of the image memory system 283 in which a pixel process unit (PPU) 310 is provided outside of the memory unit 292 in place of the above-mentioned compressor 290 and the decompressor 291. The pixel process unit (PPU) 310 performs logical calculation of input data of the PPU 310 and output data of the memory unit 292, such as, for example, AND, OR, EXOR and NOT, to output to the image forming unit. A multiplexer 311 switches an input to the memory unit 292 and a multiplexer 312 switches an output of the image forming unit. This function is generally used for composing images. For example, data from the image reading unit is composed with overlay data for a standard format which is stored in the memory unit 292 to generate a report with the standard format.

Figure 11:
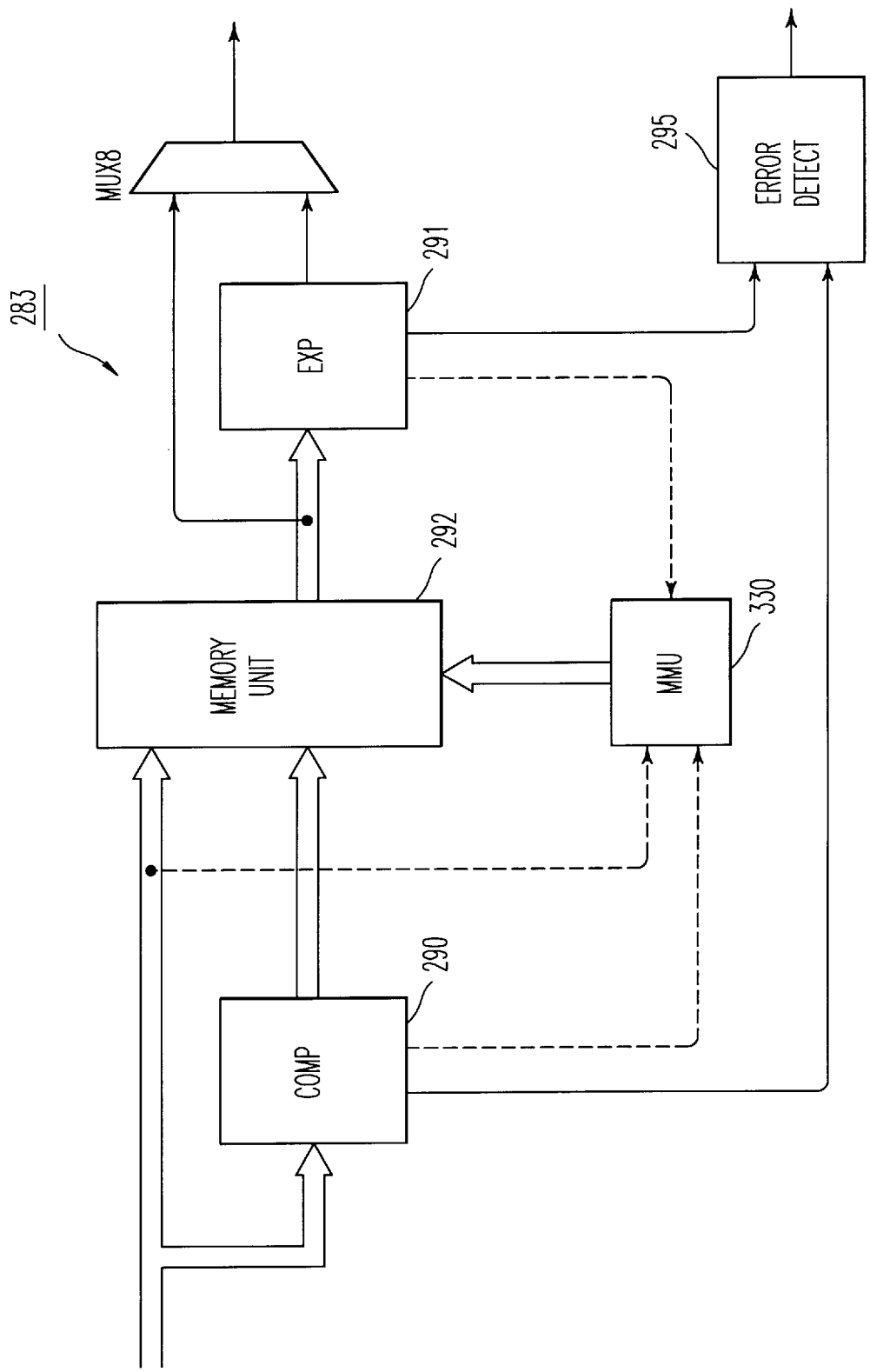
FIG. 11 is a block diagram illustrating still another example of the image memory system.

FIG. 11 is a block diagram illustrating still another example of a structure of the image memory system 283. With this structure, both compressed data and raw data for a page of the original document which is read with the image reading unit are inputted to the memory unit 292 in synchronization with the reading operation of the image reading unit. The compressed data and the raw data are stored in different areas of the memory unit 292, and the compressed data is decompressed by the decompressor 291 immediately thereafter. If the processing with the compressor 290 and the decompressor 291 is completed before the raw data of the page is stored in the memory unit 292, then, the raw data is deleted from the memory and only the compressed data remains in the memory unit 292. When the compressor 290 and the decompressor 291 fail to complete the processing of the data before the raw data of the page is stored into the memory unit 292, an error detector 295 determines that an error has occurred, and the compressed data is deleted from the memory unit 292 and only the raw data is kept in the memory unit 292.

A memory management unit (MMU) 330 is so arranged to concurrently control inputting of two input data, raw data from the selector 64 and compressed data from the compressor 290, into the memory unit 292 and outputting of one output data to the decompressor 29. In this example, the memory management unit 330 controls the compression and the decompression of the data in real time, and therefore, the data is processed at a relatively high speed. Further, the memory area of the memory unit 292 is utilized effectively, because either raw image data or compressed image data of the original document is stored. In this example, as explained above, the raw data and the compressed data are stored in different areas of one memory unit 292. However, two memory units 292 may be provided, one for raw data and the other for compressed data. This arrangement is effective for accomplishing both high printing speed and storage of image data for a large volume of pages, which are general requirements when storing image data for multiple pages in a memory and outputting the data to a printer in real time.

With the above arrangement, when the power is on, the main controller 20 performs an initializing process which includes resetting of flags, clearing of counters, clearing of the image memory 66 and resetting of an image formation mode, such as enlargement and reduction. Once the initializing process is completed, the main controller 20 waits for an occurrence of an event from the image forming unit. If an operator depresses any key of the operational panel 30 in this state, the main controller 20 is notified of the key input as a key input event.

If an event occurs in the image forming unit, such as, for example, detection of an original document on the ADF 1 with the original document detector 7, the event is reported to the main controller 20 as an image formation event. The main controller 20 determines if the event is a key input event or an image formation event to execute a corresponding process in accordance with the event, and after executing the process, the main controller 20 returns to a state of waiting for an event.

Figure 12A:
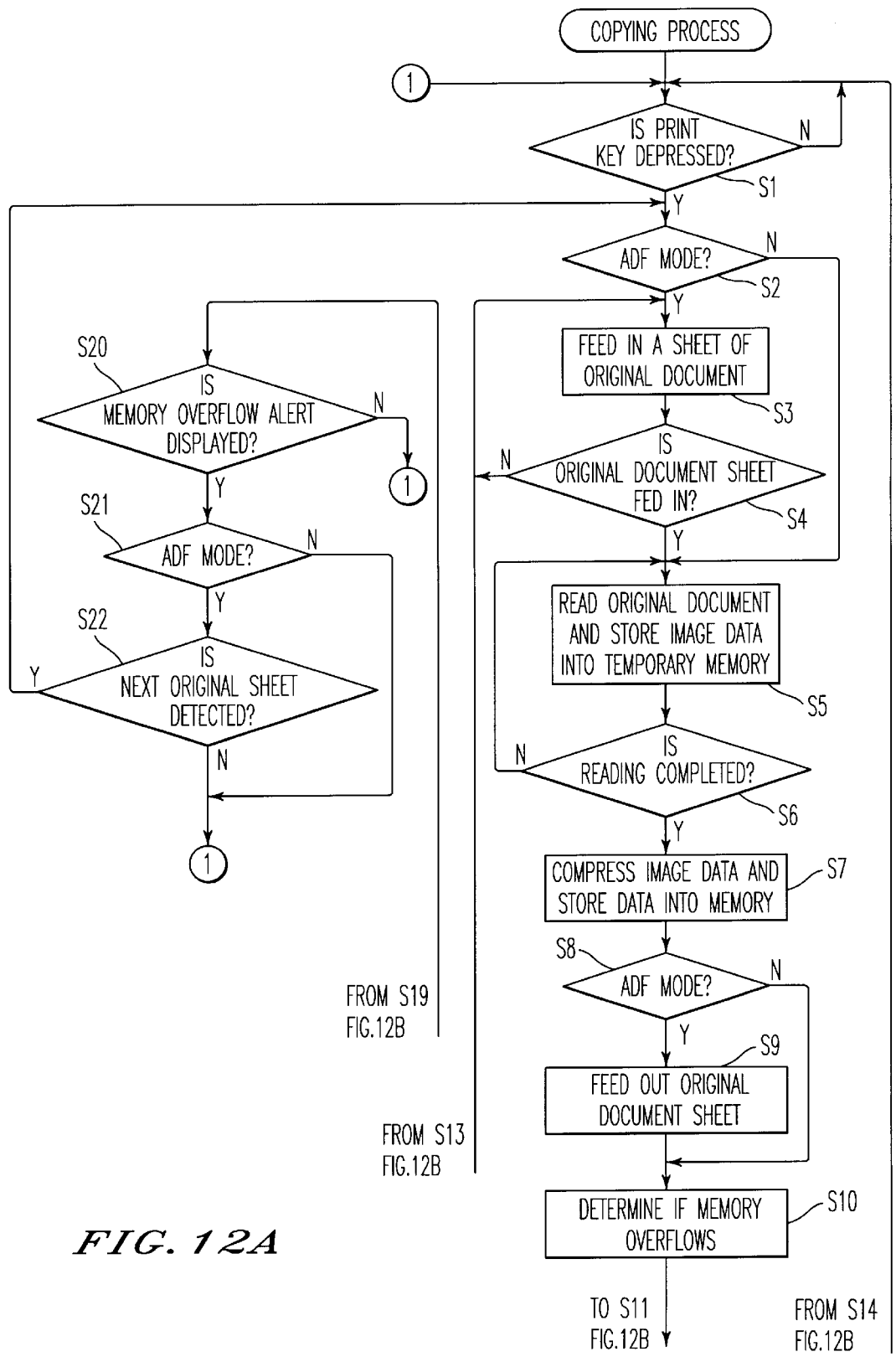
FIG. 12 is a flowchart illustrating an example of a copying process according to a first embodiment of the present invention.
Figure 12B:
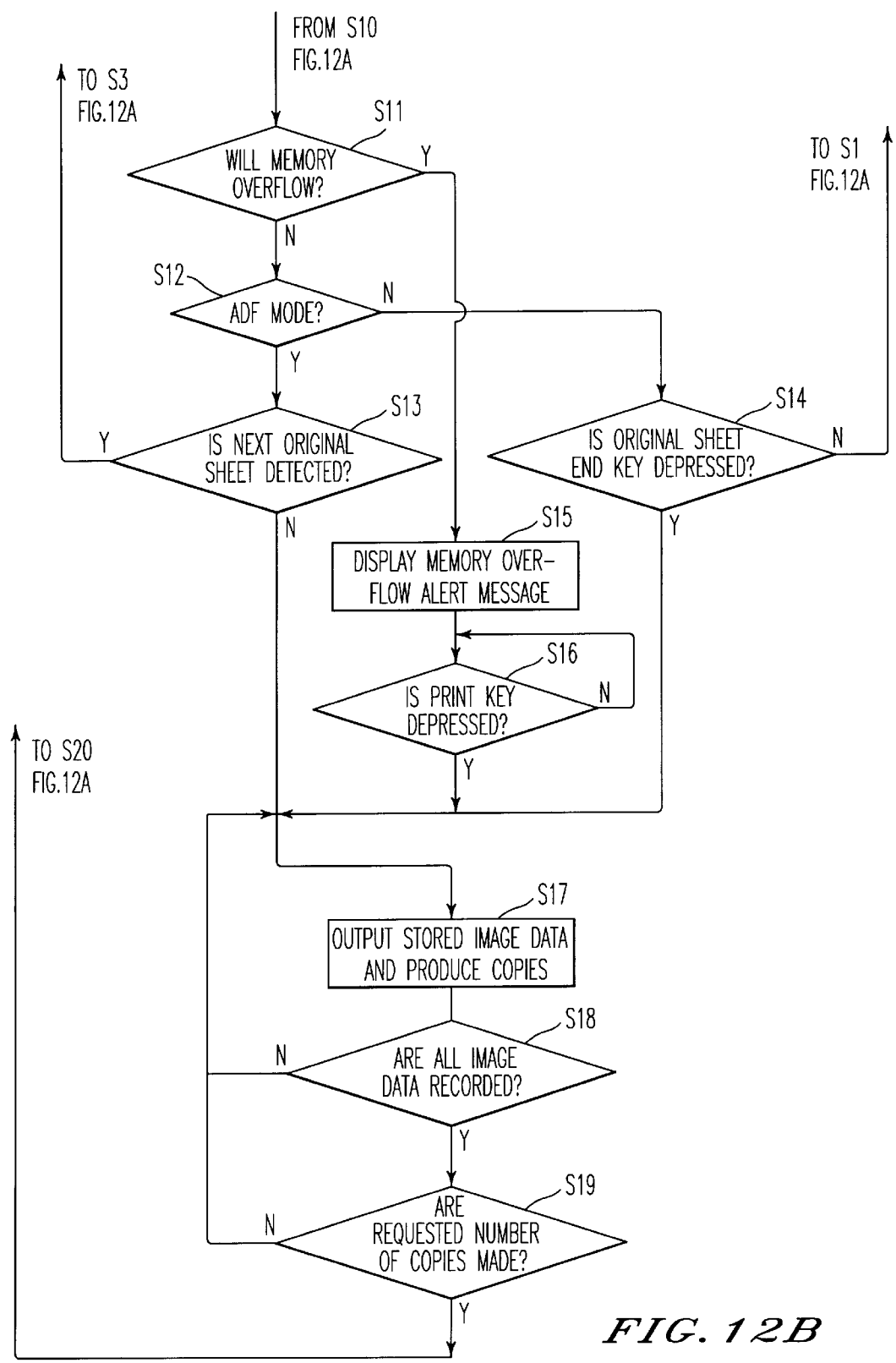
Figure 13:
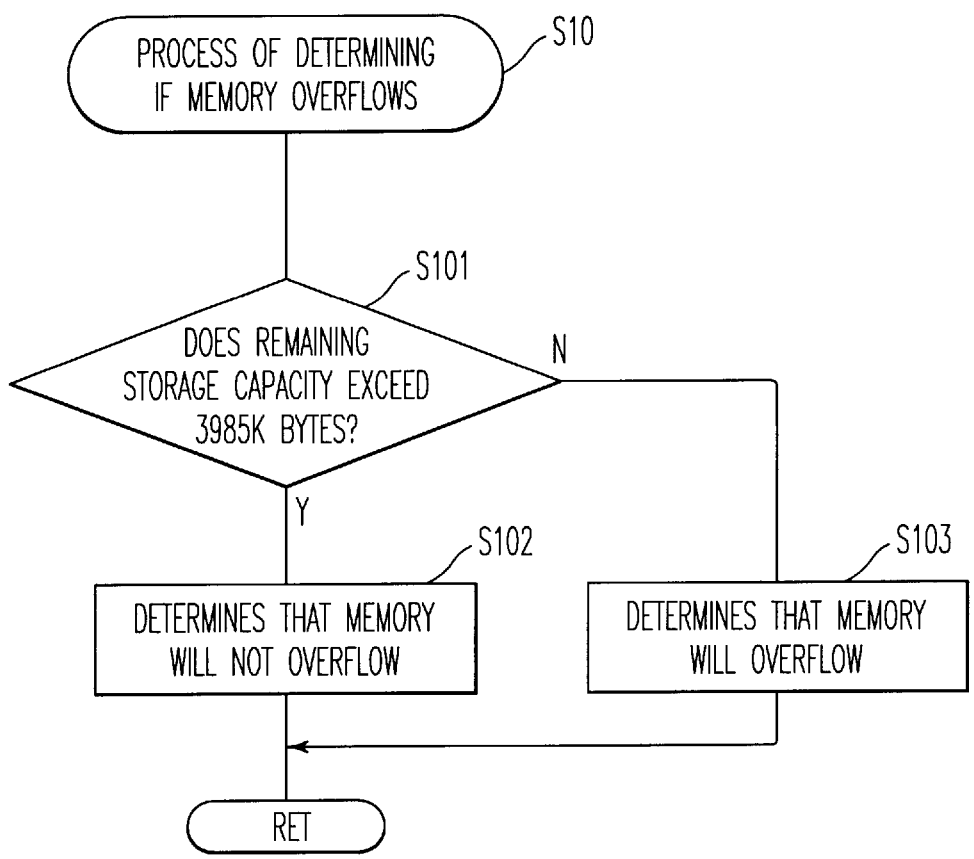
FIG. 13 is a flowchart illustrating in detail a process of determining if a memory will overflow in the first embodiment.

FIGS. 12 and 13 are flowcharts showing an example of a copying process according to the present invention including a process of determining if the image memory 66 will overflow. The process is executed by the main controller 20 when the print key 34 is depressed with a sort mode being selected. In this embodiment, the maximum number of picture elements are 4800 in the primary scanning direction and 6800 in the secondary scanning direction. Therefore, when image data is written in the image memory 66 with binary data, the maximum image size becomes 3985 k bytes, if 1 k byte is given by 1024 bytes.

In FIG. 12, the process starts when the print key 34 is depressed in step S1, and step S2 determines if an ADF mode is selected by detecting an original document placed on the ADF 1 with the original document detector 7. If the answer in step S2 is YES, the process proceeds to step S3, and if the answer in step S2 is NO, it is determined that a non-ADF mode is selected and the process jumps to step S5. The step S3 executes a process of feeding a sheet of the original document on the ADF 1 onto the contact glass 6, and the process proceeds to step S5 when the feeding process is completed in step S4.

The step S5 reads an image of a page of the sheet of the original document on the contact glass 6 to temporarily store the resulting image data in a temporary area of the image memory 66, and step S6 determines if the reading of the image of the original document is completed by determining if a trailing edge of the sheet of the original document is detected. If the reading is completed, step S7 compresses the image data in the temporary image memory area with a compression algorithm known in the facsimile industry and stores the compressed data in a sorting memory area of the image memory 66. With the compression algorithm in the facsimile industry, such as for example, a modified-Hoffman (MH) method, there occurs a case that an amount of compressed data becomes larger than that of raw data before compression.

Next, step S8 determines if the ADF mode is prescribed, and if the ADF mode is prescribed, step S9 executes a process of feeding a next sheet of the original document on the ADF 1. If the non-ADF mode is prescribed, the process jumps to step S10. The process of feeding the next sheet of the original document may be executed after the step S6 completes the reading.

The step S10 performs a process of determining whether or not the image memory 66 will overflow if an image of a next page of the original document is read and the resulting image data is stored in the image memory 66, which is illustrated in detail in FIG. 13. In FIG. 13, step S101 determines if a remaining storage capacity of the image memory 66 exceeds a predetermined maximum size of image data for one page of the original document, which is 3985 k bytes in this example. If the answer in the step S101 is YES, step S102 determines that the image memory 66 will not overflow even if a next page of the original document is read and the resulting image data is stored in the image memory 66, and if the answer is NO, step S103 determines that the image memory 66 will overflow.

As explained before, there is a case that an amount of compressed data of image data exceeds that of the raw data when the image data is compressed with the MH method. However, when such a case occurs, the raw data before compression may be stored in the image memory 66 instead. Therefore, if the remaining storage capacity of the image memory 66 exceeds 3985 k bytes, an image of the next page of the original document is stored without fail in the image memory 66, and an overflow of the image memory 66 will not occur.

If step S11 determines that the image memory 66 will not overflow, the process proceeds to step 12 and the following steps. If the step S11 determines that the image memory 66 will overflow, the process proceeds to step S15 and the following steps. If step S12 determines that the ADF mode is prescribed and if step S13 detects a next sheet of the original document on the ADF 1, the process returns to the step S3 and steps S4–S13 are performed. If the next sheet of the original document is not detected in step S13, the process proceeds to step S17.

If the non-ADF mode is prescribed, step S14 displays a message requesting to depress the original document end key when all pages of the original document are read, together with the soft original document end key, in the message display area 39 of the operational panel 31. The step S14 further determines if the original document end key is depressed, and if the answer in step S14 is NO, the process returns to the step S1 and the steps S2–S14 are performed. If the answer in step S14 is YES, the process proceeds to step S17.

If the image memory 66 will overflow as determined in step S11, step S15 displays an alert message indicating a memory overflow and waits for an event. If the print key 34 is depressed in this state, the process proceeds from step S16 to step S17.

Then, steps S17–S19 perform a process of producing a prescribed number of sets of copies of pages of the original document which are stored in the image memory 66. If the memory overflow alert is not ON in step S20, the process returns to step S1. If the memory overflow alert is ON in step S20, the process proceeds to step S21 and determines if the ADF mode is prescribed. If the ADF mode is prescribed and if step S22 detects a next sheet of the original document on the ADF 1, the process returns to step S2. If the next sheet of the original document is not detected in step S22, the process returns to step S1.

As described above, according to the above-mentioned embodiment, the image forming apparatus determines, before reading an image of a next page of the original document, whether or not the image memory 66 will overflow if the image of the next page of the original document is read and the resulting image data is stored in the image memory 66. If it is determined that the image memory 66 will overflow, reading of the next page of the original document is prohibited both in the ADF and non-ADF modes, and feeding of a next sheet of the original document with the ADF 1 is prohibited in the ADF mode.

Therefore, the image forming apparatus according to the present invention eliminates an occurrence of such a case that a sheet of the original document, which is fed out from the ADF onto the contact glass so as to be read by a reading device, has to be taken out from the contact glass and be put back to the ADF again, due to a memory overflow which occurs during storing of image data of a page of the original document into the memory, thus greatly improving copying productivity. Further, the image forming apparatus eliminates an occurrence of such an inconvenient case that an operator misunderstands that an image of a page of an original document which is on the contact glass 6 has been read and the resulting image data has been stored in the memory, even though the image data for that particular page has not been stored in the memory due to memory overflow which occurred during storing the image data of that page, and then restarts copying the original document from the next page of the original document, resulting in that the page of the image data which has not been stored in the memory is missed from the copies. Further, since occurrence of such a missing page is prevented as mentioned above, it is not necessary to display a message indicating that the page of the original document on the contact glass has not been read and is required to be read again, thus simplifying the process of displaying messages.

Figure 14A:
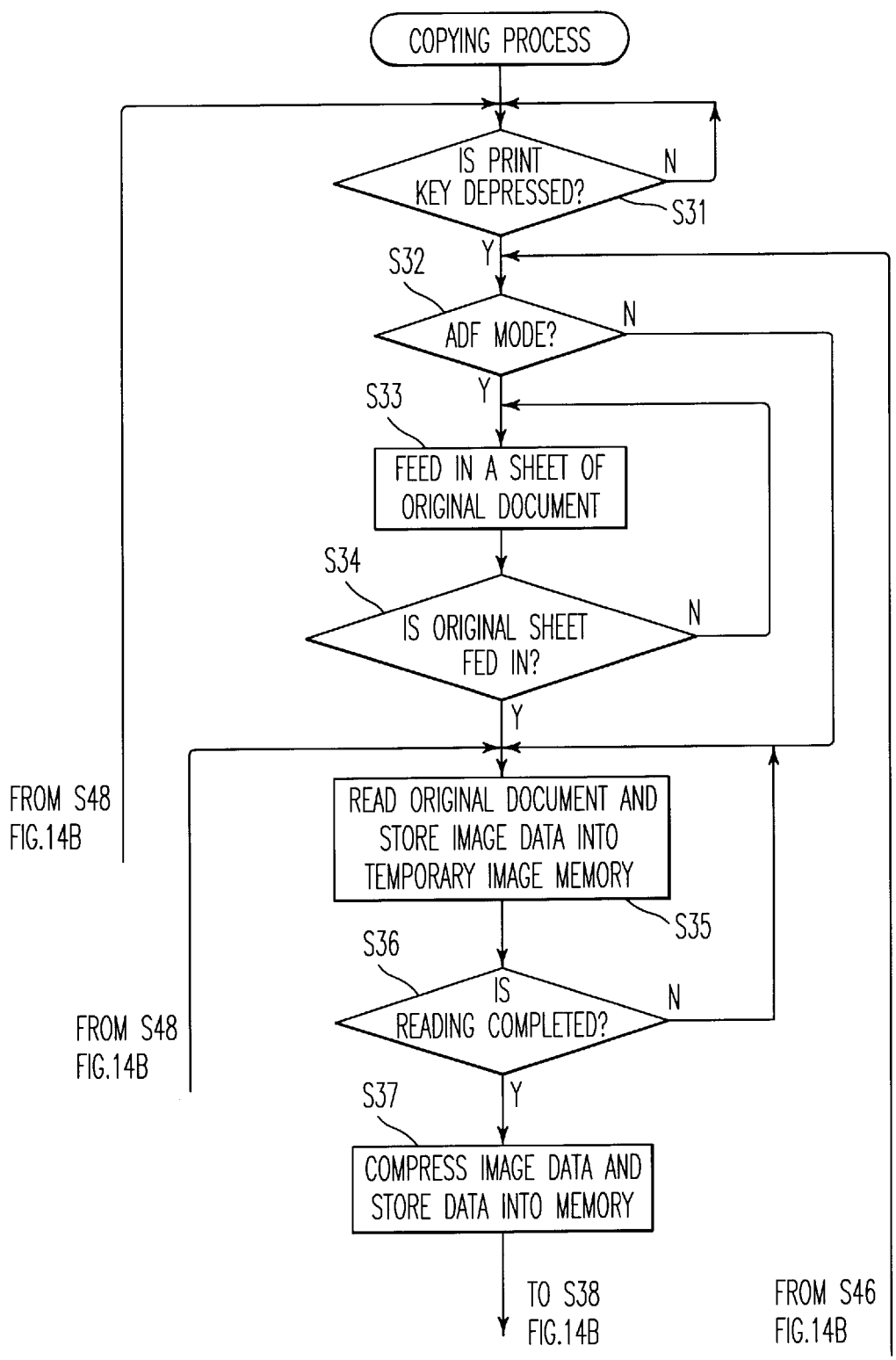
FIG. 14 is a flowchart illustrating an example of a copying process according to a second embodiment of the present invention.
Figure 14B:
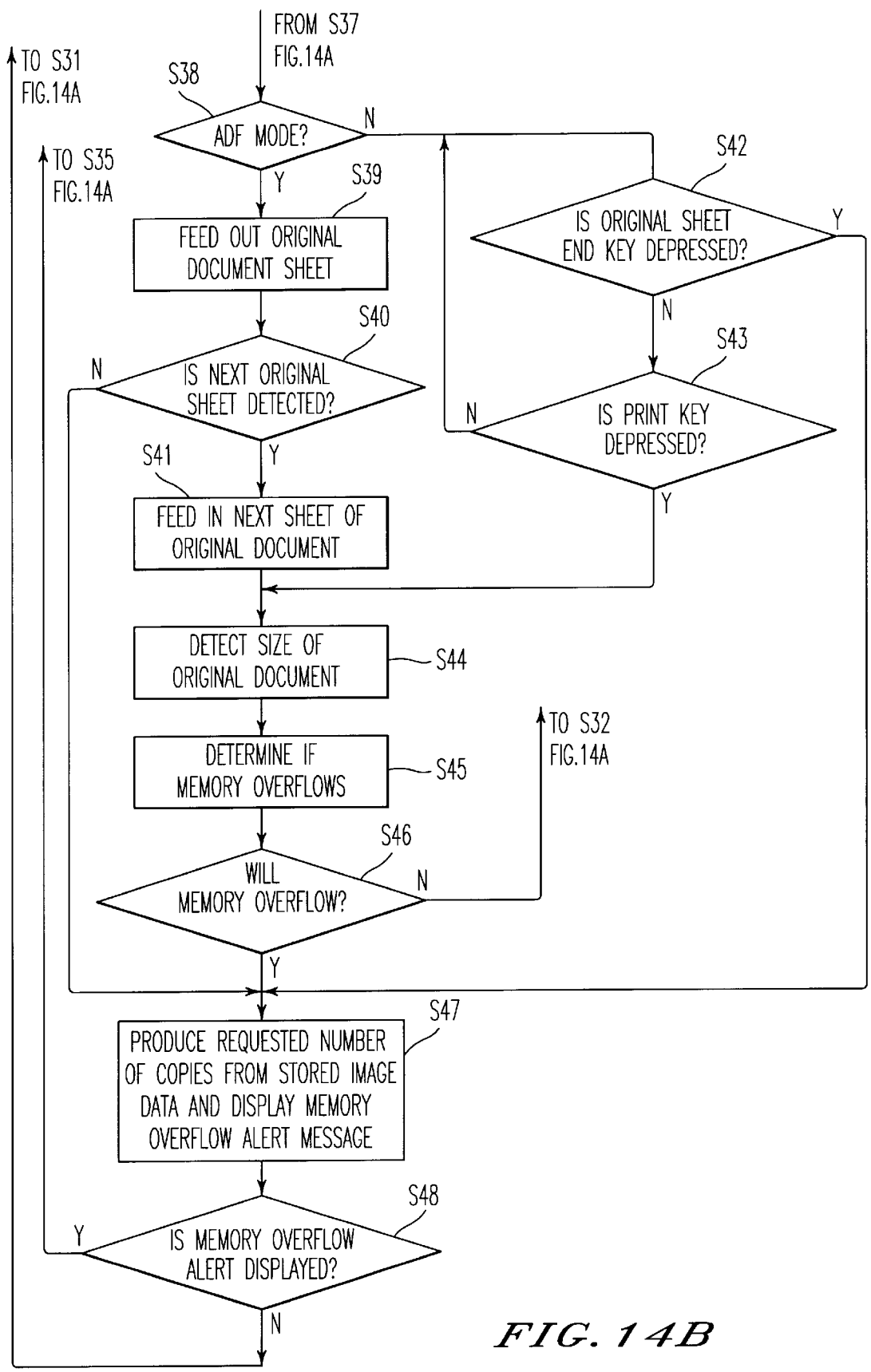

Next, FIG. 14 is a flowchart illustrating another example of a copying process according to the present invention.

In the first example, it is determined that the image memory 66 will overflow if the predetermined maximum image data size for one page of the original document exceeds a remaining storage capacity of the image memory 66. Therefore, when a maximum size of image data for one page of an original document is smaller than the predetermined maximum image data size, that is, when a sheet of the original document is smaller than the contact glass, it occurs that the memory space of the image memory 66 is not fully utilized because it is determined that a memory overflow will occur and thereby reading of a next page of the original document is prohibited even though the memory overflow will not occur, thus leaving the remaining storage space of the image memory 66 unused. The second example solves such an inconvenience and utilizes the memory space of the image memory 66 more effectively.

In FIG. 14, steps S31 through S37 are the same as the steps S1 through step S7 of the first example shown in FIG. 12. If the ADF mode is prescribed in step S38, step S39 executes a process of feeding the sheet of the original document out of the contact glass 6. Step S40 then determines an existence of a next sheet of the original document on the ADF 1, and if the answer in the step S40 is YES, the process proceeds to step S41 to feed the next sheet of the original document onto the contact glass 6. If the answer in the step S40 is NO, the process proceeds to step S47.

If the step S38 determines that the non-ADF mode is prescribed, step S42 determines if the original document end key is depressed. If the original document end key is not depressed, step S43 determines if the print key 34 is depressed. If the original document end key is depressed, the process proceeds from the step S42 to step S47, and if the print key 34 is depressed, the process proceeds from the step S43 to step S44.

The step S44 detects a size of the sheet of the original document which is fed in the step S41 with the original document size detector 41, and step S45 determines whether or not the image memory 66 will overflow if an image of a page of the sheet of the original document, the size of which is detected in the step S44, is read and the resulting image data is stored in the image memory 66 by comparing a remaining storage capacity of the image memory 66 with a required memory capacity for storing the image data of the page of the original document, the size of which is detected in the step S44. Here, for determining the required memory capacity, an amount of raw image data of the page of the original document, which is calculated in accordance with the size of the sheet of the page and a magnification ratio for image formation prescribed by the operator, is compared with an amount of raw image data of a transfer sheet which is selected by the operator, and the smaller amount of the two is selected as the required memory capacity. The smaller amount is then compared with the remaining storage capacity of the image memory 66, and if the remaining storage capacity is smaller, it is determined that the image memory 66 will overflow if the next page of the original document is read and the resulting image data is stored into the image memory 66.

If it is determined in step S46 that the image memory 66 will not overflow, the process returns to the step S32 for reading the next page of the original document. If the image memory 66 will overflow in step S46, step S47 performs a process of producing a prescribed number of sets of copies of pages which are stored in the image memory 66. If the alert message indicating a memory overflow is not displayed in step S48, the process returns to the step S31. If the alert message is displayed in the step S48, the process returns to the step S35 to read a next page of the original document.

Figure 15:
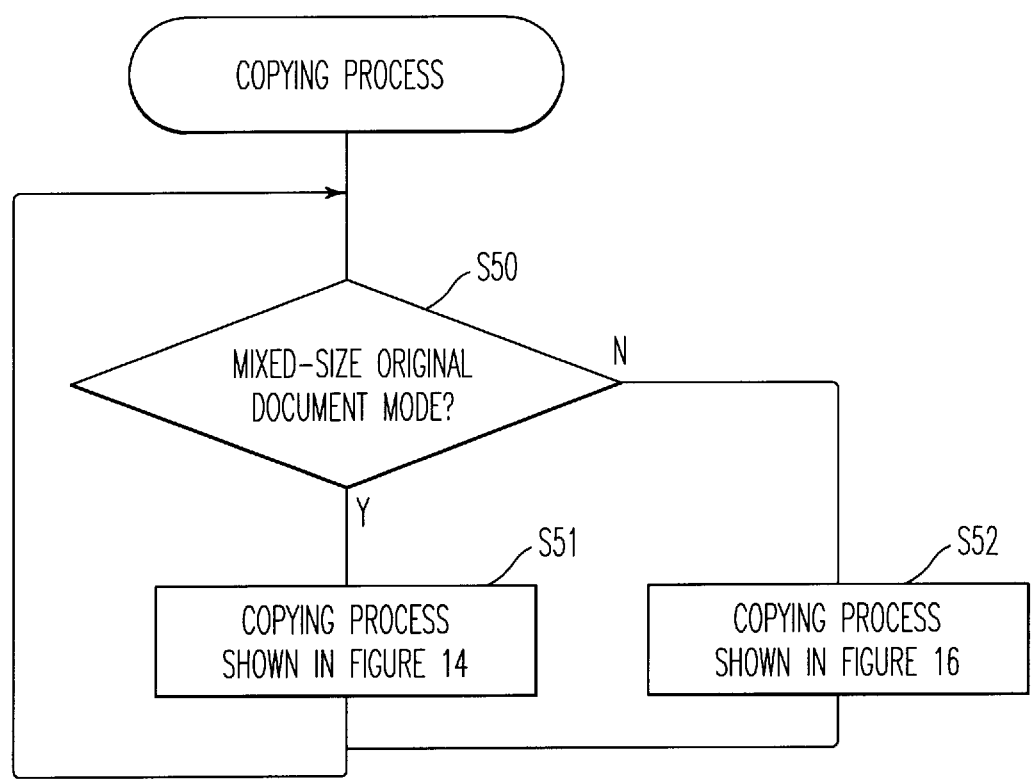
FIG. 15 is a flowchart illustrating a process of determining if a mixed-size original document mode is prescribed in a copying process according to a third embodiment of the present invention.
Figure 16A:
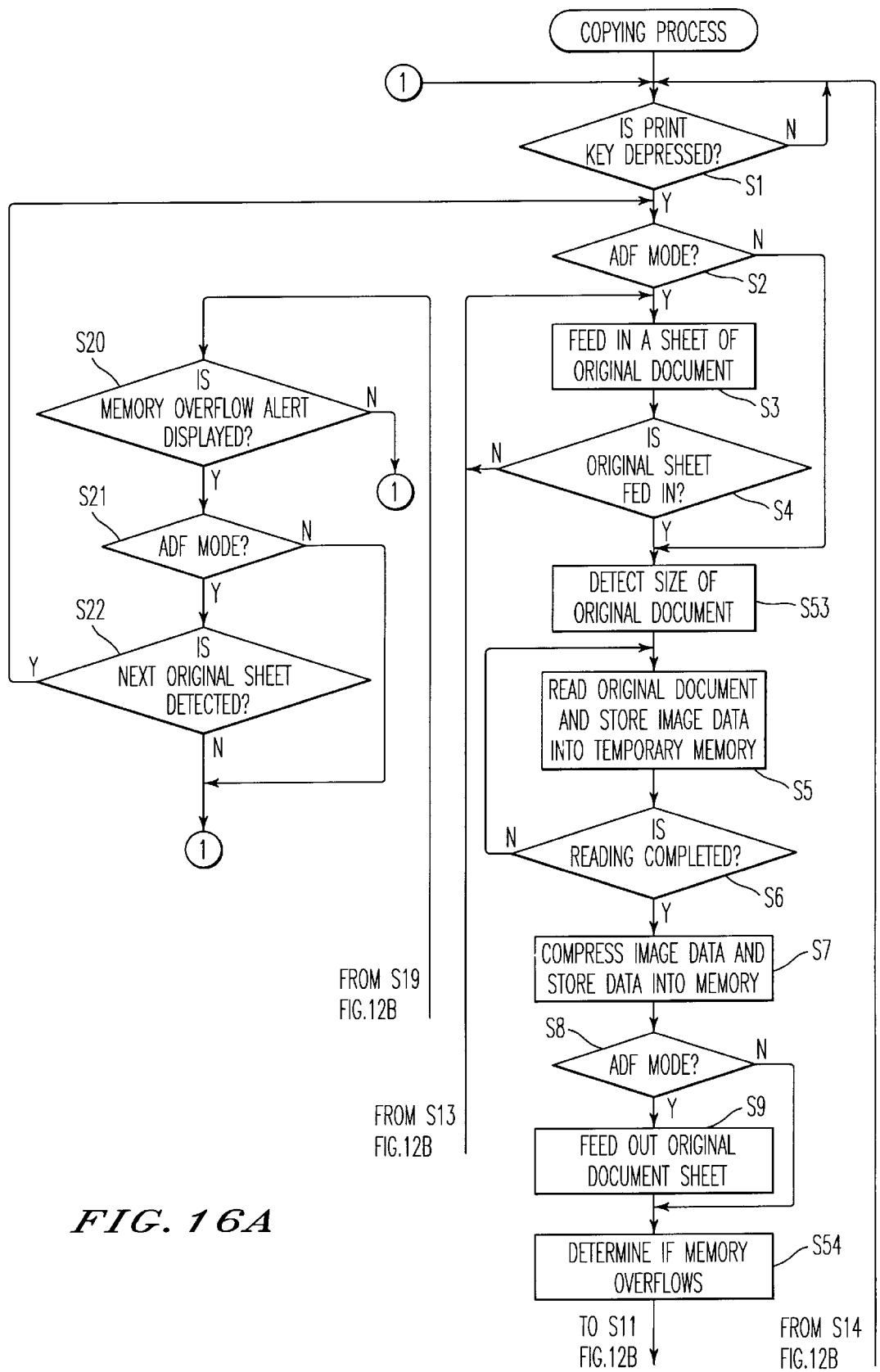
FIG. 16 is a flowchart illustrating a copying process in a case that the mixed-size original document mode is not prescribed in the third embodiment.
Figure 16B:
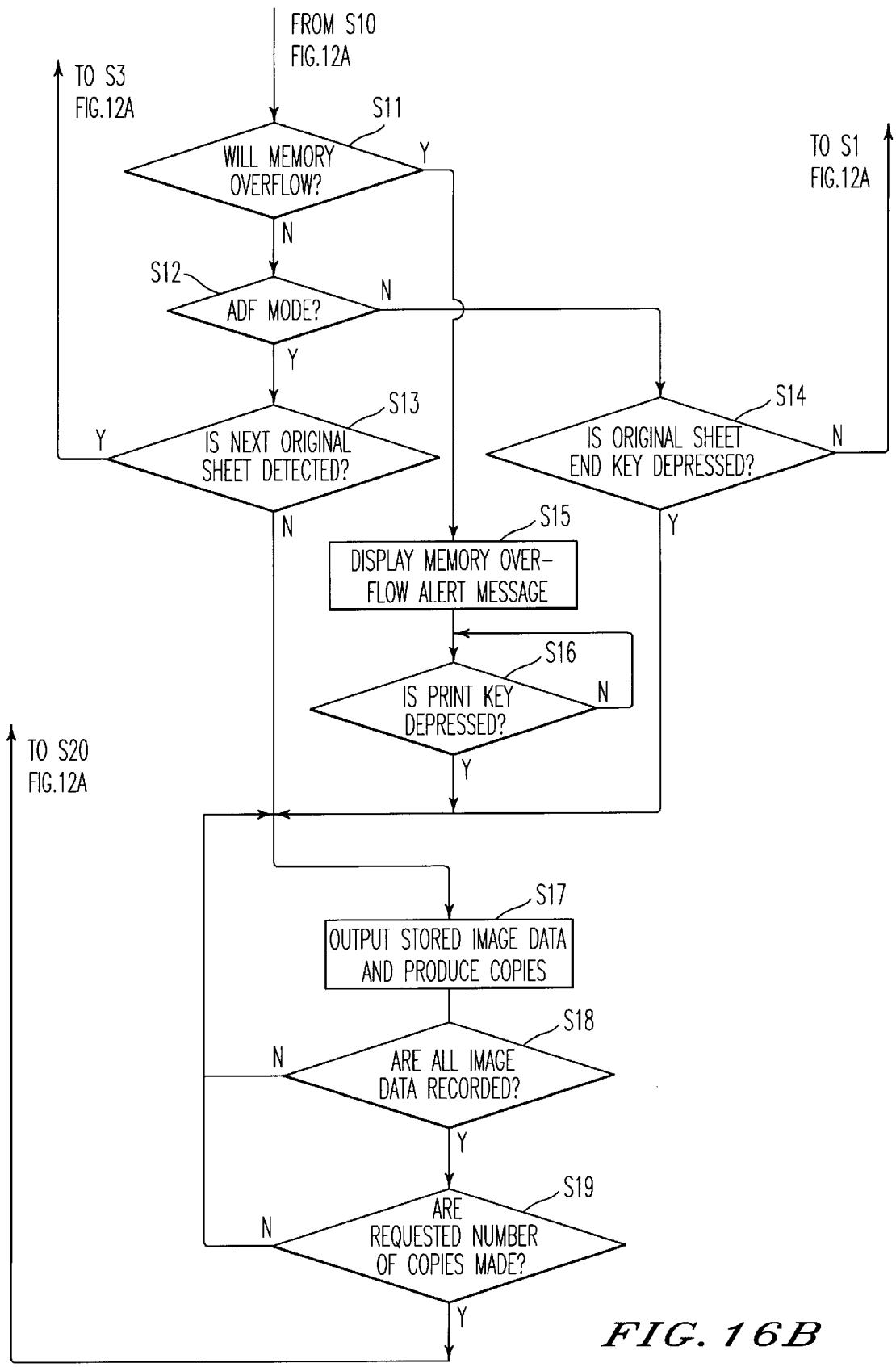
Figure 17:
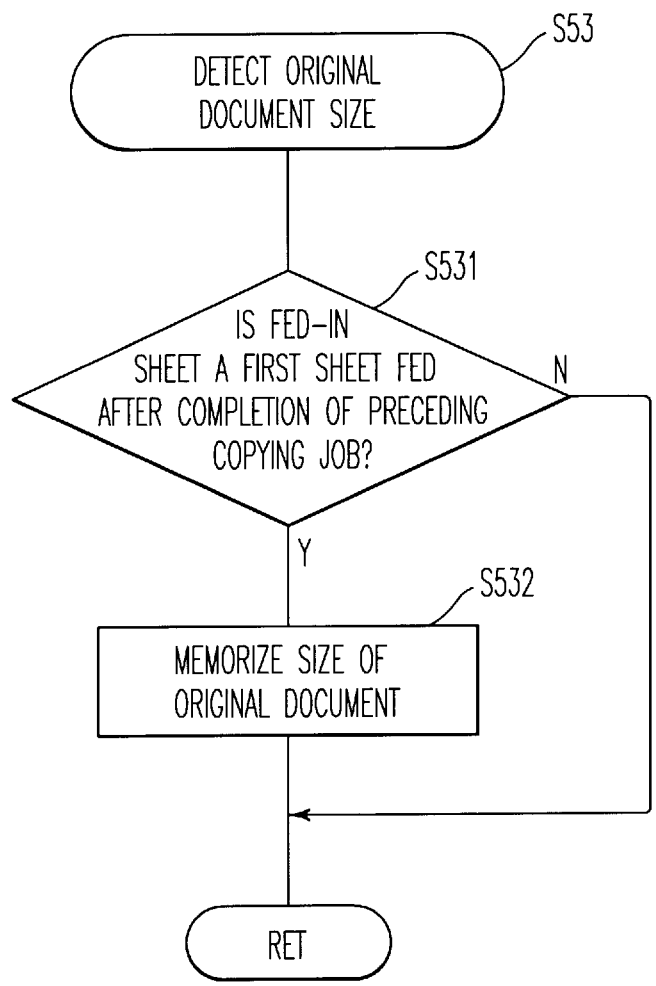
FIG. 17 is a flowchart illustrating in detail a process of detecting a size of a sheet of the original document in the third embodiment.

Next, referring to FIGS. 15–17, a third example of a copying process of the present invention is explained. FIG. 15 is a flowchart illustrating a process of determining if a mixed-size original document mode is prescribed, FIG. 16 is a flowchart explaining a process of copying in a case that the mixed-size original document mode is not prescribed and FIG. 17 is a flowchart explaining in detail a process of detecting a size of the original document when the mixed-size original document mode is not prescribed.

In FIG. 15, step S50 determines if a mixed-size original document mode is prescribed, and if the mixed-size mode is prescribed, step S51 performs a copying process illustrated in FIG. 14. If the mixed-size original document mode is not prescribed, step S52 performs a copying process illustrated in FIG. 16. When the mixed-size original document mode is prescribed, a size of each sheet of the original document is detected as illustrated in step S44 of FIG. 14 and whether or not the image memory 66 will overflow is determined based upon the size of each sheet of the original document which is detected. When the mixed-size original document original mode is not prescribed, on the other hand, a size of a sheet of the original document which is fed a first time after completion of a preceding copying job is detected and stored in a memory as illustrated in step S53 of FIG. 16 and more in detail in FIG. 17. Then, whether or not the image memory 66 will overflow is determined in step S54 of FIG. 16 based upon the size of the first sheet of the original document memorized in the memory in step S532 of FIG. 17.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means;

means for feeding each page of the multiple sheet original document page after page onto said original document placing means;

means for detecting a size of each page of the original document before an image of each page of the original document is read by said image reading means;

wherein said control means determines if the predetermined maximum amount of image data for one page of the original document exceeds the remaining storage capacity of said image storing means each time after said original document feeding means feeds one page of the original document onto the original document placing means, said image reading means reads an image of each page of the original document which is fed onto said original document placing means and the resulting image data is stored into said image storing means, and then prohibits feeding of a next page of the original document with said original document feeding means if the predetermined maximum amount of image data for one page of the original document exceeds the remaining storage capacity of said image storing means;

wherein said control means determines if an amount of image data of each page of the original document, the size of which is detected by said original document size detect means, exceeds the remaining storage capacity of said image storing means based upon the size of each page of the original document which is detected by said original document size detect means, and prohibits reading of the next page of the original document with said image reading means if the amount of the image data of the page, the size of which is detected with said original document size detect means, exceeds the remaining storage capacity of said image storing means; and wherein said control means calculates an amount of image data of each page of the original document, the size of which is detected with said original document size detect means, in accordance with the size of each page and a magnification ratio for image formation prescribed by an operator, compares the amount of image data of each page with an amount of image data of a transfer sheet which is selected by the operator to select a smaller amount, determines if said smaller amount exceeds the remaining storage capacity of the image storing means, and prohibits reading of the next page of the original document with said image reading means if said smaller amount exceeds the remaining storage capacity of said image storing means.

2. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium; and control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means;

wherein said image storing means comprises a compressor for compressing image data and a decompressor for decompressing compressed image data, and said image storing means stores therein both raw image data and compressed image data of the image which is read with said image reading means and deletes the raw image data stored therein after compression of the image data.

3. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means; and means for feeding each page of the multiple sheet original document page after page onto said original document placing means;

wherein said control means determines if the predetermined maximum amount of image data for one page of the original document exceeds the remaining storage capacity of said image storing means each time after said original document feeding means feeds one page of the original document onto the original document placing means, said image reading means reads an image of each page of the original document which is fed onto said original document placing means and the resulting image data is stored into said image storing means, and then prohibits feeding of a next page of the original document with said original document feeding means if the predetermined maximum amount of image data for one page of the original document exceeds the remaining storage capacity of said image storing means; and wherein said image storing means comprises a compressor for compressing image data and a decompressor for decompressing compressed image data, and said image storing means stores therein both raw image data and compressed image data of the image which is read with said image reading means and deletes the raw image data stored therein after compression of the image data.

4. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means;

means for feeding each page of the multiple sheet original document page after page onto said original document placing means;

means for detecting a size of each page of the original document before an image of each page of the original document is read by said image reading means;

wherein said control means determines if the predetermined maximum amount of image data for one page of the original document exceeds the remaining storage capacity of said image storing means each time after said original document feeding means feeds one page of the original document onto the original document placing means, said image reading means reads an image of each page of the original document which is fed onto said original document placing means and the resulting image data is stored into said image storing means, and then prohibits feeding of a next page of the original document with said original document feeding means if the predetermined maximum amount of image data for one page of the original document exceeds the remaining storage capacity of said image storing means;

wherein said control means determines if an amount of image data of each page of the original document, the size of which is detected by said original document size detect means, exceeds the remaining storage capacity of said image storing means based upon the size of each page of the original document which is detected by said original document size detect means, and prohibits reading of the next page of the original document with said image reading means if the amount of the image data of the page, the size of which is detected with said original document size detect means, exceeds the remaining storage capacity of said image storing means; and wherein said image storing means comprises a compressor for compressing image data and a decompressor for decompressing compressed image data, and said image storing means stores therein both raw image data and compressed image data of the image which is read with said image reading means and deletes the raw image data stored therein after compression of the image data.

5. An image forming apparatus according to claim 4, comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means;

means for feeding each page of the multiple sheet original document page after page onto said original document placing means;

means for detecting a size of each page of the original document before an image of each page of the original document is read by said image reading means;

means for prescribing a mixed-size original document reading mode:

wherein said control means determines if the predetermined maximum amount of image data for one page of the original document exceeds the remaining storage capacity of said image storing means each time after said original document feeding means feeds one page of the original document onto the original document placing means, said image reading means reads an image of each page of the original document which is fed onto said original document placing means and the resulting image data is stored into said image storing means, and then prohibits feeding of a next page of the original document with said original document feeding means if the predetermined maximum amount of image data for one page of the original document exceeds the remaining storage capacity of said image storing means;

wherein said control means determines if an amount of image data of each page of the original document, the size of which is detected by said original document size detect means, exceeds the remaining storage capacity of said image storing means based upon the size of each page of the original document which is detected by said original document size detect means, and prohibits reading of the next page of the original document with said image reading means if the amount of the image data of the page, the size of which is detected with said original document size detect means, exceeds the remaining storage capacity of said image storing means;

wherein said control means determines if the amount of image data of each page of the original document which is detected with said original document size detect means exceeds the remaining storage capacity of said image storing means based upon the size of each page of the original document which is detected with said original document size detect means when said mixed-size original document reading mode is prescribed, and based upon a size of a first page of the original document which is detected with said original document size detect means when said mixed-size original document reading mode is not prescribed, and prohibits reading of the next page of the original document with said image reading means, if the amount of the image data of each page of the original document, the size of which is detected with said original document size detect means, exceeds the remaining storage capacity of said image storing means, when the mixed-size original document mode is prescribed, and if the amount of the image data of the first page of the original document, the size of which is detected with said original document size detect means, exceeds the remaining storage capacity of said image storing means, when the mixed-size original document mode is not prescribed; and wherein said image storing means comprises a compressor for compressing image data and a decompressor for decompressing compressed image data, and said image storing means stores therein both raw image data and compressed image data of the image which is read with said image reading means and deletes the raw image data stored therein after compression of the image data.

6. An image forming apparatus comprising:

an image reader for reading images of a multiple page original document;

an image memory for storing therein image data of the original document which is read with said image reader;

a printer for outputting the image data stored in said image memory and recording the output image data on a recording medium;

a controller for determining if a predetermined maximum amount of image data for each page of the original document exceeds a remaining storage capacity of said image memory each time after said image reader reads an image of each page of the original document and stores a resulting image data into said image memory, and prohibiting a reading operation of said image reader if the predetermined maximum amount of image data for one page of the original document exceeds the remaining storage capacity of said image memory;

an original document feeder for feeding a page of the original document page after page to said image reader, and wherein said controller determines if the predetermined maximum amount of image data for one page of the original document exceeds the remaining storage capacity of said image memory each time after said image reader reads each page of the original document which is fed with said original document feeder to said image reader and the resulting image data is stored into said image memory, and then prohibits feeding of a next page of the original document with said original document feeder if the predetermined maximum amount of image data for one page of the original document exceeds the remaining storage capacity of said image memory; and a detector detecting a size of each page of the original document before an image of each page of the original document is read by said image reader;

wherein said controller determines if an amount of image data of each page of the original document, the size of which is detected by said detector, exceeds the remaining storage capacity of said image memory based upon the size of each page of the original document which is detected by said detector, and prohibits reading of the next page of the original document with said image reader if the amount of the image data of the page, the size of which is detected with said detector, exceeds the remaining storage capacity of said image memory;

wherein said controller calculates an amount of image data of each page of the original document, the size of which is detected with said detector, in accordance with the size of each page and a magnification ratio for image formation prescribed by an operator, compares the amount of image data of each page with an amount of image data of a transfer sheet which is selected by the operator to select a smaller amount, determines if said smaller amount exceeds the remaining storage capacity of the image memory, and prohibits reading of the next page of the original document with said image reader if said smaller amount exceeds the remaining storage capacity of said memory.

7. An image forming apparatus comprising:

an image reader for reading images of a multiple page original document;

an image memory for storing therein image data of the original document which is read with said image reader;

a printer for outputting the image data stored in said image memory and recording the output image data on a recording medium; and a controller for determining if a predetermined maximum amount of image data for each page of the original document exceeds a remaining storage capacity of said image memory each time after said image reader reads an image of each page of the original document and stores a resulting image data into said image memory, and prohibiting a reading operation of said image reader if the predetermined maximum amount of image data for one page of the original document exceeds the remaining storage capacity of said image memory;

wherein said image memory comprises a compressor for compressing image data and a decompressor for decompressing compressed image data, and said image memory stores therein both raw image data and compressed image data of the image which is read with said image reader and deletes the raw image data stored therein after compression of the image data.

8. An image forming apparatus comprising:

an image reader for reading images of a multiple page original document;

an image memory for storing therein image data of the original document which is read with said image reader;

a printer for outputting the image data stored in said image memory and recording the output image data on a recording medium; and a controller for determining if a predetermined maximum amount of image data for each page of the original document exceeds a remaining storage capacity of said image memory each time after said image reader reads an image of each page of the original document and stores a resulting image data into said image memory, and prohibiting a reading operation of said image reader if the predetermined maximum amount of image data for one page of the original document exceeds the remaining storage capacity of said image memory;

wherein said printer records the image data stored in said image storing means in order of pages of the original document;

wherein said image memory comprises a compressor for compressing image data and a decompressor for decompressing compressed image data, and said image memory stores therein both raw image data and compressed image data of the image which is read with said scanner and deletes the raw image data stored therein after compression of the image data.

9. An image forming apparatus comprising:

an image reader for reading images of a multiple page original document;

an image memory for storing therein image data of the original document which is read with said image reader;

a printer for outputting the image data stored in said image memory and recording the output image data on a recording medium;

a controller for determining if a predetermined maximum amount of image data for each page of the original document exceeds a remaining storage capacity of said image memory each time after said image reader reads an image of each page of the original document and stores a resulting image data into said image memory, and prohibiting a reading operation of said image reader if the predetermined maximum amount of image data for one page of the original document exceeds the remaining storage capacity of said image memory;

an original document feeder for feeding a page of the original document page after page to said image reader, and wherein said controller determines if the predetermined maximum amount of image data for one page of the original document exceeds the remaining storage capacity of said image memory each time after said image reader reads each page of the original document which is fed with said original document feeder to said image reader and the resulting image data is stored into said image memory, and then prohibits feeding of a next page of the original document with said original document feeder if the predetermined maximum amount of image data for one page of the original document exceeds the remaining storage capacity of said image memory; and a detector detecting a size of each page of the original document before an image of each page of the original document is read by said image reader;

wherein said controller determines if an amount of image data of each page of the original document, the size of which is detected by said detector, exceeds the remaining storage capacity of said image memory based upon the size of each page of the original document which is detected by said detector, and prohibits reading of the next page of the original document with said image reader if the amount of the image data of the page, the size of which is detected with said detector, exceeds the remaining storage capacity of said image memory; and wherein said image memory comprises a compressor for compressing image data and a decompressor for decompressing compressed image data, and said image memory stores therein both raw image data and compressed image data of the image which is read with said image reader and deletes the raw image data stored therein after compression of the image data.

10. An image forming apparatus comprising:

an image reader for reading images of a multiple page original document;

an image memory for storing therein image data of the original document which is read with said image reader;

a printer for outputting the image data stored in said image memory and recording the output image data on a recording medium;

a controller for determining if a predetermined maximum amount of image data for each page of the original document exceeds a remaining storage capacity of said image memory each time after said image reader reads an image of each page of the original document and stores a resulting image data into said image memory, and prohibiting a reading operation of said image reader if the predetermined maximum amount of image data for one page of the original document exceeds the remaining storage capacity of said image memory;

an original document feeder for feeding a page of the original document page after page to said image reader, and wherein said controller determines if the predetermined maximum amount of image data for one page of the original document exceeds the remaining storage capacity of said image memory each time after said image reader reads each page of the original document which is fed with said original document feeder to said image reader and the resulting image data is stored into said image memory, and then prohibits feeding of a next page of the original document with said original document feeder if the predetermined maximum amount of image data for one page of the original document exceeds the remaining storage capacity of said image memory;

a detector detecting a size of each page of the original document before an image of each page of the original document is read by said image reader; and a control for prescribing a mixed-size original document reading mode;

wherein said controller determines if an amount of image data of each page of the original document, the size of which is detected by said detector, exceeds the remaining storage capacity of said image memory based upon the size of each page of the original document which is detected by said detector, and prohibits reading of the next page of the original document with said image reader if the amount of the image data of the page, the size of which is detected with said detector, exceeds the remaining storage capacity of said image memory;

wherein said controller determines if the amount of image data of each page of the original document which is detected with said detector exceeds the remaining storage capacity of said image memory based upon the size of each page of the original document which is detected with said detector when said mixed-size original document reading mode is prescribed, and based upon a size of a first page of the original document which is detected with said detector when said mixed-size original document reading mode is not prescribed, and prohibits reading of the next page of the original document with said image reader if the amount of the image data of each page of the original document, the size of which is detected with said detector, exceeds the remaining storage capacity of said image memory, when the mixed-size original document mode is prescribed, and if the amount of the image data of the first page of the original document, the size of which is detected with said detector, exceeds the remaining storage capacity of said image memory, when the mixed-size original document mode is not prescribed; and wherein said image memory comprises a compressor for compressing image data and a decompressor for decompressing compressed image data, and said image memory stores therein both raw image data and compressed image data of the image which is read with said image reader and deletes the raw image data stored therein after compression of the image data.

11. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means; and means for detecting a size of each page of the original document before an image of each page of the original document is read by said image reading means;

wherein said control means determines if an amount of image data of each page of the original document, the size of which is detected by said original document size detect means, exceeds the remaining storage capacity of said image storing means based upon the size of each page of the original document which is detected by said original document size detect means, and prohibits reading of the next page of the original document with said image reading means if the amount of the image data of the page, the size of which is detected with said original document size detect means, exceeds the remaining storage capacity of said image storing means; and wherein said control means calculates an amount of image data of each page of the original document, the size of which is detected with said original document size detect means, in accordance with the size of each page and a magnification ratio for image formation prescribed by an operator, compares the amount of image data of each page with an amount of image data of a transfer sheet which is selected by the operator to select a smaller amount, determines if said smaller amount exceeds the remaining storage capacity of the image storing means, and prohibits reading of the next page of the original document with said image reading means if said smaller amount exceeds the remaining storage capacity of said image storing means.

12. An image forming apparatus comprising:

means for placing thereupon pages of a multiple page original document;

means for reading an image of each page of the original document placed on said original document placing means;

means for storing therein image data of the image of each page of the original document which is read by said image reading means;

means for outputting the image data stored in said image storing means and recording the output image data on a recording medium;

control means for determining if a predetermined maximum amount of image data for each page of the original document exceeds a remaining storage capacity of said image storing means each time after said image reading means reads an image of each page of the original document and stores resulting image data into said image storing means, and prohibiting reading of a next page of the original document with said image reading means if the predetermined maximum amount of image data for one page of the original document exceeds the remaining storage capacity of said image storing means; and means for detecting a size of each page of the original document before an image of each page of the original document is read by said image reading means;

wherein said control means determines if an amount of image data of each page of the original document, the size of which is detected by said original document size detect means, exceeds the remaining storage capacity of said image storing means based upon the size of each page of the original document which is detected by said original document size detect means, and prohibits reading of the next page of the original document with said image reading means if the amount of the image data of the page, the size of which is detected with said original document size detect means, exceeds the remaining storage capacity of said image storing means; and wherein said image storing means comprises a compressor for compressing image data and a decompressor for decompressing compressed image data, and said image storing means stores therein both raw image data and compressed image data of the image which is read with said image reading means and deletes the raw image data stored therein after compression of the image data.

* * * * *